United States Patent [19]

Naka et al.

[11] Patent Number: 5,664,248
[45] Date of Patent: Sep. 2, 1997

[54] PHOTOGRAPHIC CAMERA

[75] Inventors: Yoji Naka; Toshio Yoshida; Takashi Kamoda, all of Saitama-ken, Japan

[73] Assignees: Fuji Photo Optical Co., Ltd., Saitama-Ken; Fuji Photo Film Co., Ltd., Kanagawa, both of Japan

[21] Appl. No.: 689,265

[22] Filed: Aug. 6, 1996

[30] Foreign Application Priority Data

| Aug. 8, 1995 | [JP] | Japan | 7-201980 |
| Aug. 8, 1995 | [JP] | Japan | 7-201981 |
| Sep. 6, 1995 | [JP] | Japan | 7-229196 |
| Sep. 7, 1995 | [JP] | Japan | 7-230348 |

[51] Int. Cl.$^6$ ............ G03B 17/26; G03B 17/30; G03B 17/38; G03B 1/12
[52] U.S. Cl. ............ 396/503; 396/413; 396/513; 396/516; 396/538
[58] Field of Search ............ 396/502, 503, 396/512, 513, 516, 538, 405, 413, 410, 266

[56] References Cited

U.S. PATENT DOCUMENTS

| 4,721,973 | 1/1988 | Harvey | 396/503 |
| 5,003,332 | 3/1991 | Watanabe et al. | 396/410 |
| 5,481,325 | 1/1996 | Wada et al. | 396/538 |
| 5,500,705 | 3/1996 | Stephenson, III | 396/516 |
| 5,565,951 | 10/1996 | Tokui | 396/538 |
| 5,565,952 | 10/1996 | Shimizu et al. | 396/538 |

FOREIGN PATENT DOCUMENTS

| 661585-A1 | 7/1995 | European Pat. Off. . |
| 661587-A1 | 7/1995 | European Pat. Off. . |

Primary Examiner—A. A. Mathews
Attorney, Agent, or Firm—Sughrue, Mion, Zinn, Macpeak & Seas

[57] ABSTRACT

A photographic camera has a cartridge chamber in which is loaded a film cartridge having a roll film entirely rolled to its leading end around a spool in a cartridge body and a light-shielding shutter member for opening and shutting a film exit slit formed in the cartridge body, an entrance opening to the cartridge chamber, and a chamber lid which is mounted on the camera to be moved between an opening position where it opens the entrance opening and a closed position where it closes the entrance opening. A shutter lock member moves to a shutter locking position, where it prevents release of the shutter of the camera, in response to operation of a rewind button. A holding member holds the shutter lock member in the shutter locking position, and a release member causes the holding member to release the shutter lock member after closure of the light-shielding shutter member of the film cartridge in response to opening of the chamber lid.

6 Claims, 19 Drawing Sheets

F I G. 14
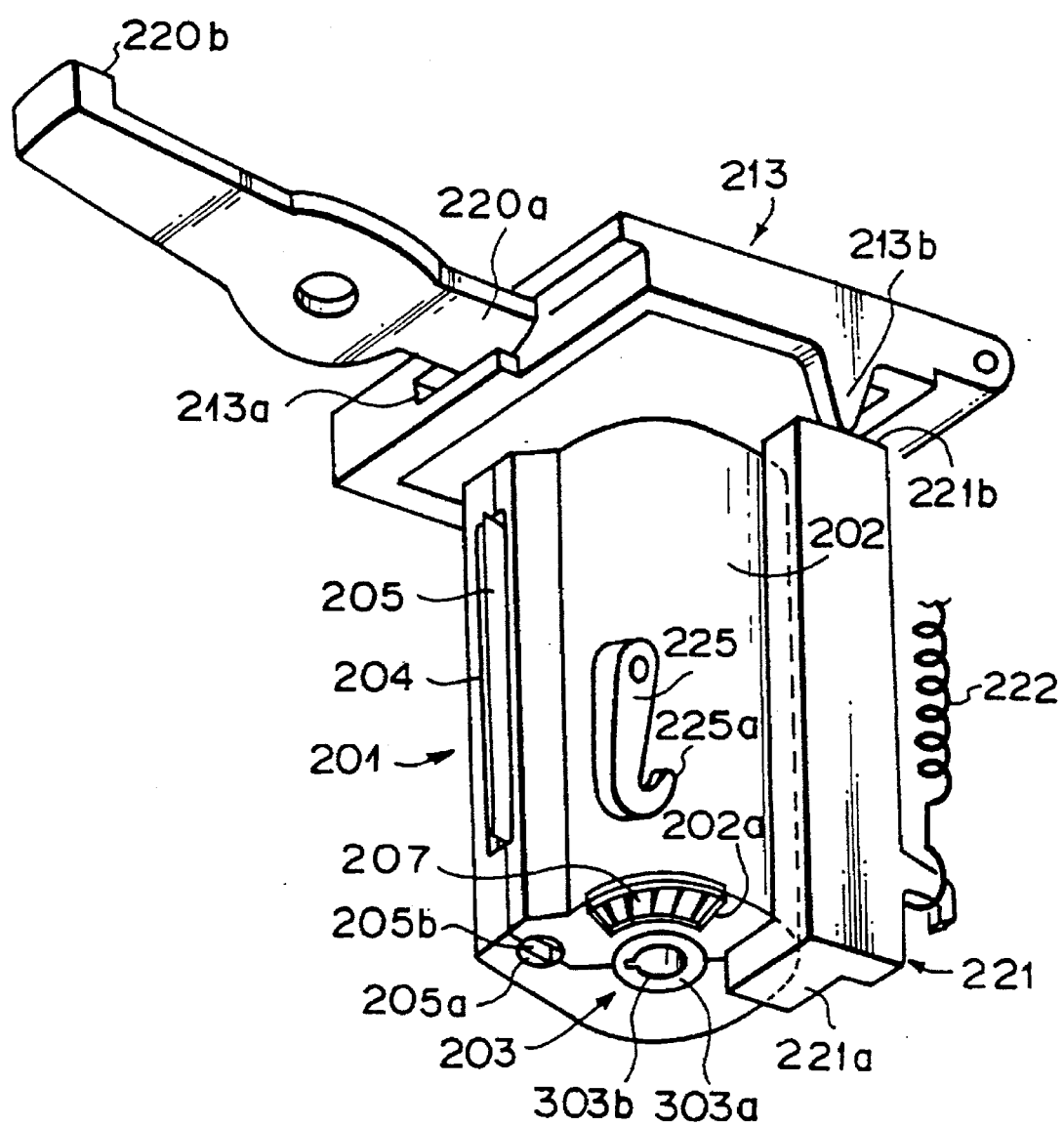

F I G. 18
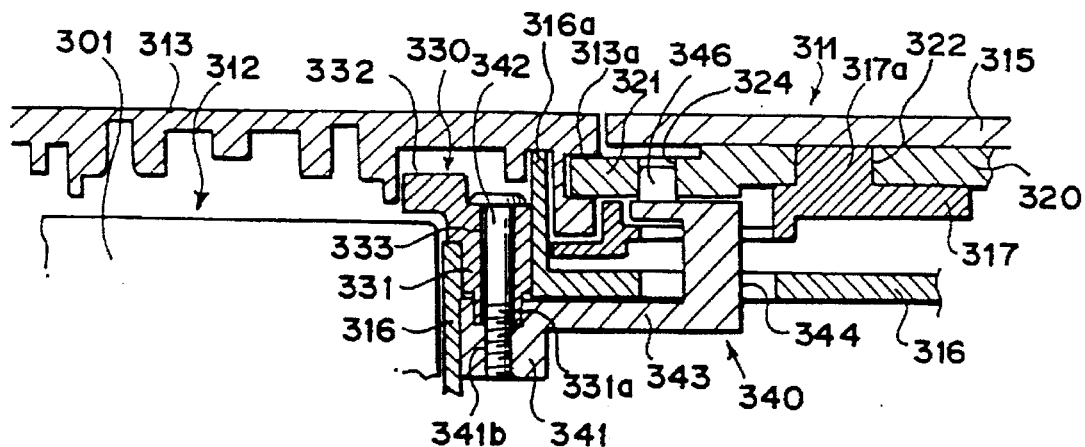
F I G. 19
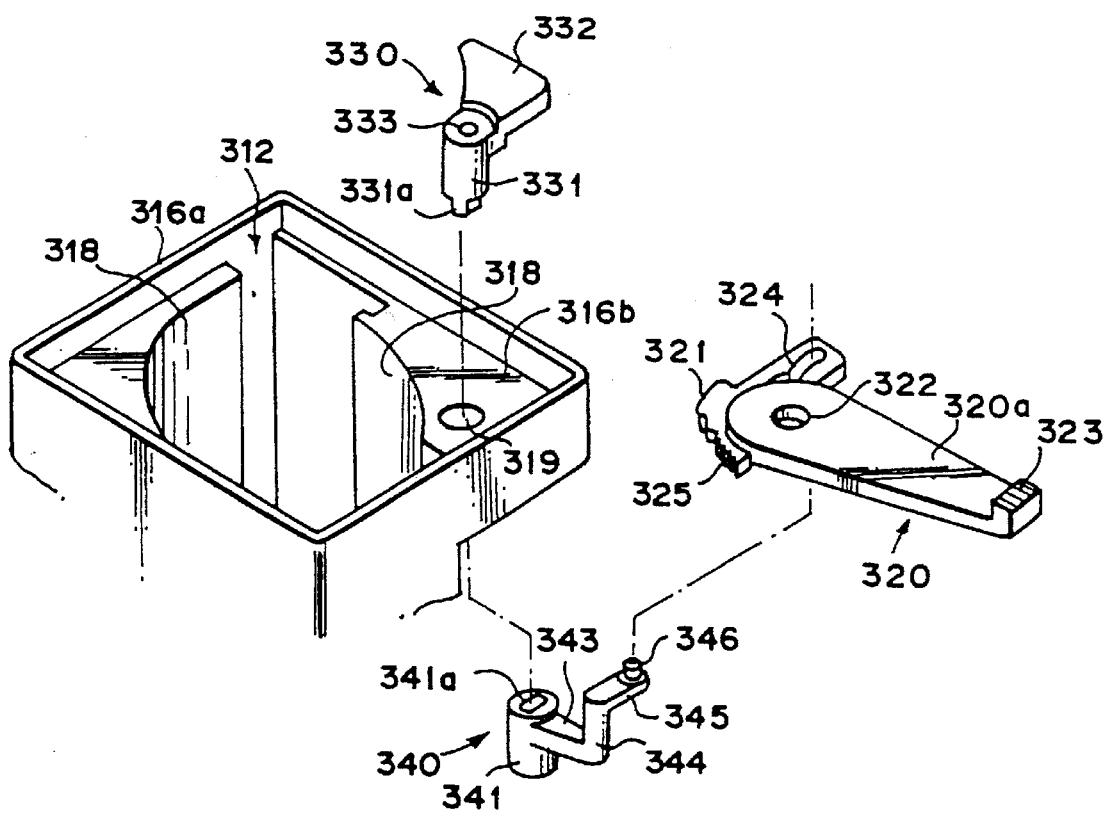

PHOTOGRAPHIC CAMERA

BACKGROUND OF THE INVENTION

1. Field of the Invention

This invention relates to a photographic camera which uses a film cartridge having a film exit slit and a light-shielding shutter member for opening and closing the film exit slit.

2. Description of the Related Art

Recently there has been proposed a novel film cartridge in which a roll film is entirely rolled to its leading end around a spool in a cartridge body having a film exit slit and a light-shielding shutter member for opening and shutting the film exit slit. In such a film cartridge, when the film exit slit is shut, the roll film is entirely rolled around a spool to its leading end and held in a light-tight fashion and the roll film is fed out of the cartridge body and rewound into the cartridge body with the film exit slit opened.

Further there have proposed various photographic cameras which use such a novel film cartridge. Generally such a photographic camera is provided with a cartridge chamber in which the novel film cartridge is loaded, a chamber lid which opens and closes an entrance opening to the cartridge chamber, a spool drive member which is engaged with the spool of the film cartridge loaded in the cartridge chamber and rotates the spool to feed out and rewind the film from and into the cartridge body, and a shutter member opening/closing member which is engaged with the light-shielding shutter member of the film cartridge and opens and closes the film exit slit.

In such photographic cameras, however, there are various points to be improved.

For example, in such cameras, when the film cartridge is taken out from the camera after exposure, a rewind button is operated to rewind the film into the film cartridge to its leading end and the chamber lid is opened. When taking out the film cartridge, an exposure condition indicator is switched to indicate "exposed", and a mechanism for preventing the film cartridge whose exposure condition indicator is in "exposed" position from being loaded in the camera is provided to prevent double exposure.

However when the shutter release button is depressed with the rewound film cartridge kept in the cartridge chamber, the film in the film cartridge can be fed out again to cause double exposure unlike the conventional film magazine in which the film cannot be drawn out the magazine again when the film leader is once rewound into the magazine.

Further in the novel film cartridge, there is a problem that even after rewinding is completed and even if the film is not fed out the film cartridge in response to depression of the shutter release button, light can reach the film in the film cartridge upon release of the shutter so long as the light-shielding shutter member of the film cartridge is kept open unlike the conventional film magazine in which the film slit is closed by light-shielding filling after the film leader is drawn into the magazine.

Generally an ejector is provided in the cartridge chamber to lift the film cartridge by a predetermined about then the chamber lid is opened. Conventionally ejector lifts the film cartridge by an amount sufficient to disengage the spool drive member and the shutter member opening/closing member respectively from the spool and the light-shielding shutter member. Accordingly, when the film cartridge is inserted into the cartridge chamber, the film cartridge is supported by the ejector in the lifted position. From the viewpoint of easiness in loading the film cartridge, it is preferred that the film cartridge be less lifted in the lifted position so that the film cartridge can be forced into the cartridge chamber by simply closing the chamber lid without pushing the film cartridge by a finger or the like. However from the viewpoint of easiness in taking out the film cartridge, it is preferred that the film cartridge be more lifted in the lifted position.

Thus there is a demand for a film cartridge loading mechanism which enables the film cartridge to be forced into the cartridge chamber by simply closing the chamber lid and at the same time enables the film cartridge to be easily taken out from the cartridge chamber.

Further the light-shielding shutter member of the film cartridge loaded in the camera, which has been closed, must be opened when the film is to be fed out from the film cartridge for exposure and must be closed when the film cartridge is to be taken out. In view of cost, it is preferred that such opening and closing action of the light-shielding shutter member be not effected by a motor control system but be effected mechanically, for instance, in response to movement of a key member for opening and closing the chamber lid.

That is, when the film cartridge is loaded in the cartridge chamber with the light-shielding shutter member closed, said shutter member opening/closing member is engaged with a cutaway portion on the end portion of the light-shielding shutter member and when the chamber lid is closed and the key member is moved from the release position to the locking position, the shutter member opening/closing member is rotated in one direction to open the light-shielding shutter member in response to the movement of the key member. Then when the film cartridge is to be taken out, the key member is moved from the locking position to the release position and the shutter member opening/closing member is rotated in the reverse direction to close the light-shielding shutter member in response to the movement of the key member.

In such an arrangement, if the key member is not in a predetermined release position upon insertion of the film cartridge, the shutter member opening/closing member cannot be in place relative to the cutaway portion on the light-shielding shutter member and can be engaged with the cutaway portion in a wrong phase, which results in a improper opening and closing action of the light-shielding shutter member. Further when the shutter member opening/closing member is forced to be engaged with the cutaway portion in a wrong phase, one or both of them can be damaged to disable opening and closing the light-shielding shutter member.

Thus there is a demand for a mechanism which prevents the film cartridge from being loaded when the key member is not in a predetermined release position or a mechanism which holds the key member in the predetermined release position upon insertion of the film cartridge into the cartridge chamber.

SUMMARY OF THE INVENTION

In view of the foregoing observations and description, the primary object of the present invention is to provide a photographic camera for the novel film cartridge in which the shutter of the camera cannot be released when the light-shielding shutter member of the film cartridge is kept open after the film is rewound into the film cartridge.

Another object of the present invention is to provide a film cartridge loading mechanism which enables the film cartridge to be forced into the cartridge chamber by simply closing the chamber lid and at the same time enables the film cartridge to be easily taken out from the cartridge chamber.

Still another object of the present invention is to provide a mechanism which prevents the film cartridge from being loaded when the key member for opening and closing the chamber lid is not in a predetermined release position.

Still another object of the present invention is to provide a mechanism which holds the key member for opening and closing the chamber lid in the predetermined release position upon insertion of the film cartridge into the cartridge chamber.

In one aspect of the present invention, there is provided a photographic camera characterized by having a shutter release inhibiting means which inhibits release of the shutter of the camera during rewinding the film and after completion of rewinding the film so long as the light-shielding shutter member of the film cartridge is open.

In the photographic camera, the shutter of the camera cannot be released even after completion of rewinding the film so long as the light-shielding shutter member of the film cartridge is open as well as during rewinding the film. Accordingly double exposure cannot occur and at the same time, the film in film cartridge cannot be exposed to light entering the film cartridge through the film exit slit.

In one embodiment, a photographic camera comprises a shutter lock member which moves to a shutter locking position, where it prevents release of the shutter of the camera, in response to operation of a rewind button which is operated when the film is to be rewound into the film cartridge, a holding means which holds the shutter lock member in the shutter locking position, and a release means which causes the holding means to release the shutter lock member after closure of the light-shielding shutter member of the film cartridge in response to opening of the chamber lid.

It is preferred that said release means be formed by an ejector which urges the film cartridge inserted into the cartridge chamber toward the entrance of the cartridge chamber and the holding means be formed by a projection formed on the ejector to be brought into engagement with the shutter lock member.

In another embodiment, a photographic camera comprises a shutter lock member which moves to a shutter locking position, where it prevents release of the shutter of the camera, in response to operation of a rewind button which is operated when the film is to be rewound into the film cartridge, a holding means which holds the shutter lock member in the shutter locking position, and a release means which causes the holding means to release the shutter lock member after closure of the light-shielding shutter member of the film cartridge in response to lock release movement of a key member which locks the chamber lid in the closed position.

The shutter lock member may be interlocked with a barrier which opens and closes the taking lens of the camera so that the shutter lock member is moved to the shutter locking position in response to movement of the barrier to its closed position and is retracted from the shutter locking position in response to movement of the barrier to its opening position.

In this case, the shutter of the camera cannot be released when the barrier is in the closed position while release of the shutter is permitted when the barrier is in the opening position. This arrangement is advantageous in that release of the shutter can be prevented when the barrier is not properly opened.

When the camera is provided with an automatic rewinding mechanism which starts rewinding upon completion of a predetermined number of exposures or in response to operation of the rewind button, release of the shutter may be inhibited in response to operation of the automatic rewinding mechanism. Further release of inhibition of shutter release is permitted in response to action related to take-out of the film cartridge or closure of the light-shielding shutter member. But the camera may be arranged so that the light-shielding shutter member is forced to close and inhibition of shutter release is released in response to completion of rewinding and the chamber lid is automatically opened thereafter.

In another aspect of the present invention, there is provided a film cartridge loading mechanism for a photographic camera having; a cartridge chamber in which is loaded a film cartridge having a roll film rolled around a spool in a cartridge body, a light-shielding shutter member for opening and closing a film exit slit formed in the cartridge body and an exposure condition indicator which can take a first position where it indicates that the roll film is not exposed yet and a second position where it indicates that the roll film has been exposed; an entrance opening to the cartridge chamber; a chamber lid which is mounted on the camera to be swung between an opening position where it opens the entrance opening and a closed position where it closes the entrance opening; a spool driver which is engaged with the spool of the film cartridge loaded in the cartridge chamber and rotates the spool to feed out and rewind the film from and into the cartridge body; and a shutter member opening/closing member which is engaged with the light-shielding shutter member of the film cartridge and opens and closes the film exit slit.

The film cartridge loading mechanism comprises an ejector on which the film cartridge inserted into the cartridge chamber is rested and which is movable between a loaded position in which the spool and the light-shielding shutter member of the film cartridge resting thereon are respectively brought into engagement with the spool driver and the shutter member opening/closing member and a lifted position which is away from the loaded position toward the entrance opening of the cartridge chamber and in which the spool and the light-shielding shutter member of the film cartridge resting thereon are disengaged from the spool driver and the shutter member opening/closing member, an ejector spring which urges the ejector toward the lifted position, and an engagement member which is adapted to engage with a part of the film cartridge to hold the film cartridge in an engaged position when said indicator is in the second position and is not adapted to engage with the film cartridge when the indicator is in the first position, the engaged position being nearer to the entrance opening of the cartridge chamber than the position where the film cartridge is held by the ejector when the ejector is in the lifted position, and the force of the ejector spring being set so that when the chamber lid is opened, the film cartridge is jumped toward the entrance opening of the cartridge chamber beyond the engaged position but is not jumped outside the cartridge chamber.

In the film cartridge loading mechanism, since when a new film cartridge is loaded in the camera, the exposed state indicator is naturally in the first position where it indicates that the roll film is not exposed yet, the film cartridge can be inserted into the cartridge chamber to a position where it abuts against the ejector in the lifted position without interference with the engagement member. In this position, the film cartridge can be forced further into the cartridge chamber to a position where the spool and the light-shielding shutter member are engaged with the spool driver and the shutter member opening/closing member by simply closing the chamber lid.

When the film is rewound after exposure and the chamber lid is opened to take out the film cartridge, the exposed condition indicator is moved to the second position, where it indicates that the film has been exposed, and the light-shielding shutter member is closed in response to opening of the chamber lid or other action before opening the chamber lid. Further the ejector jumps the film cartridge toward the entrance opening of the cartridge chamber beyond the engaged position and the jumped film cartridge then drops toward the engaged position to be engaged with the engagement member. Thus the film cartridge is held in the engaged position in which the film cartridge projects outward sufficiently long, and accordingly the film cartridge can be easily taken out. Further when engaged with the engagement member, the film cartridge cannot be pushed inward, whereby double exposure can be prevented.

In still another aspect of the present invention, there is provided a chamber lid opening and closing mechanism characterized by having an insertion inhibiting member which is caused to project into the cartridge chamber to prevent insertion of a film cartridge in response to movement of a key member, for locking the chamber lid in the closed position, toward the locking position.

The insertion inhibiting member may be formed integrally with the key member or separately from the key member.

With this arrangement, when the key member is not in the released position with the chamber lid opened, the insertion inhibiting member is projected into the cartridge chamber and prevents insertion of the film cartridge. Accordingly, the film cartridge can be loaded only when the shutter member opening/closing member can be engaged with the cutaway portion on the light-shielding shutter member in a regular phase.

In still another aspect of the present invention, there is provided a chamber lid opening and closing mechanism characterized by having a key member which is movable between a locking position where it locks the chamber lid in a closed position and a release position where it releases the chamber lid, and a key member locking member having a lock portion which interferes with the key member to hold the key member in the release position, thereby preventing the key member from moving toward the locking position, when the chamber lid is open and an interlocking portion which is brought into contact with the chamber lid when the chamber lid is closed and is deformed to release the interference of the lock portion with the key member.

The key member locking member is preferably a resilient plate member which is deformed upon abutment against the chamber lid.

With this arrangement, the key member is held in the release position while the chamber lid is open, and accordingly the shutter member opening/closing member is held in a predetermined position where it can be engaged with the cutaway portion of the light-shielding shutter member in a proper phase.

BRIEF DESCRIPTION OF THE DRAWINGS

FIG. 14 is a fragmentary perspective view showing upside down the chamber lid locking mechanism and the ejector with the film cartridge loaded, FIG. 18 is fragmentary cross-sectional view of the camera shown in FIG. 17, FIG. 19 is an exploded perspective view of an important part of the camera shown in FIG. 17.

DESCRIPTION OF THE PREFERRED EMBODIMENTS

Figure 1:
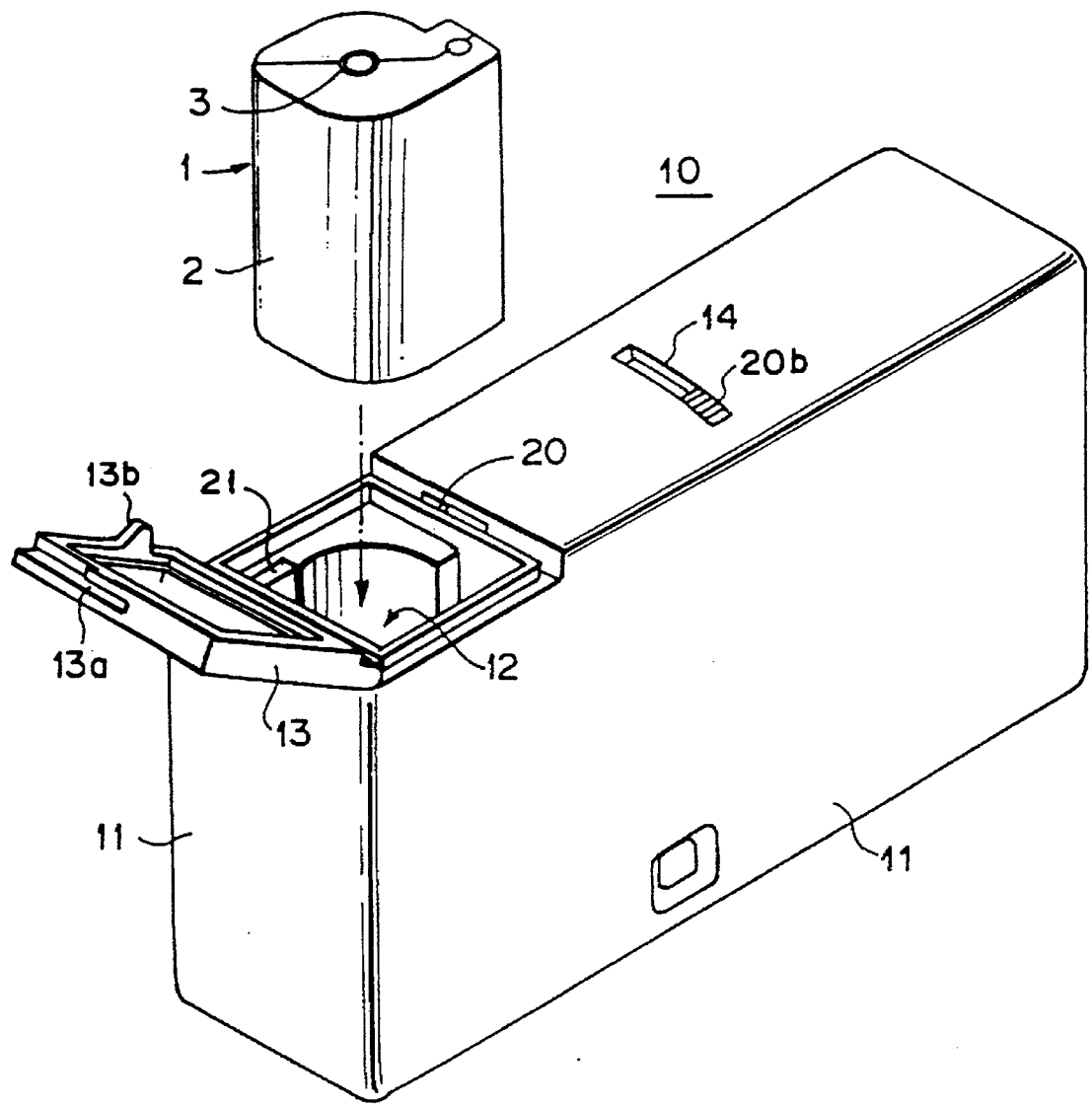
FIG. 1 is a perspective view showing upside down a photographic camera in accordance with a first embodiment of the present invention together with a film cartridge.

In FIGS. 1 to 8, a photographic camera 10 in accordance with a first embodiment of the present invention has a cartridge chamber 12 which is for receiving a film cartridge 1 and is formed in one side of a camera body 11. The entrance opening to the cartridge chamber 12 is opened and closed by a chamber lid 13 which is supported for rotation on one end of the bottom of the camera body 11.

Figure 2:
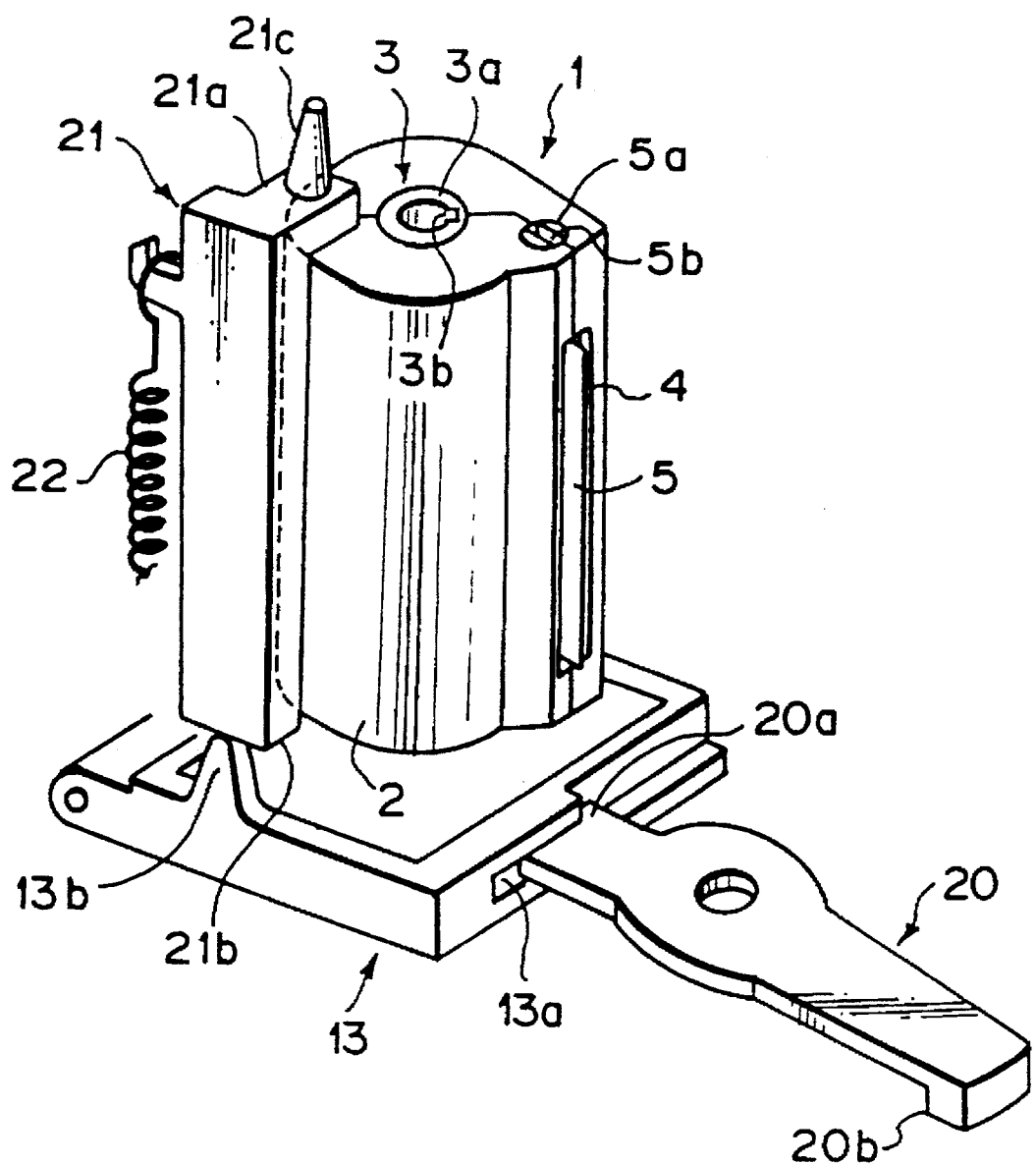
FIG. 2 is a fragmentary perspective view showing the cartridge lid lock mechanism and the ejector mechanism of the camera.

As shown in FIG. 2, the film cartridge 1 comprises a cartridge body 2 formed of resin molding halves bonded together and a photographic roll film (not shown) entirely rolled around a spool 3 in the cartridge body 2 to its leading end. A film exit slit 4 is formed in the side surface of the cartridge body 2 and a light-shielding shutter member 5 is supported for rotation in the film exit slit 4 to open and shut the film exit slit 4. The shutter member 5 extends in parallel to the spool 3 and is provided with a cutaway portion 5b at one end portion 5a which is exposed in the end face of the cartridge body 2 from which the film cartridge 1 is inserted into the cartridge chamber 12 (positioned up in FIG. 2 and down in FIG. 1; this end face will be referred to as "the upper end face", hereinbelow). The end portion 5a is engaged with a shutter member opening/closing member (not shown) disposed in the cartridge chamber 12 which rotates the shutter member 5 between an opening position where it opens the film exit slit 4 and a closed position where it closes the same. A cutaway portion (keyway) 3b is formed on the end 3a of the spool 3 which is exposed in the upper end face of the cartridge body 2. A drive member (not shown) disposed deep inside the cartridge chamber 12 is engaged with the cutaway portion 3b to feed out and rewind the film.

A key member 20 is disposed on the lower side of the camera body 11 for locking the chamber lid 13 in its closed position. The key member 20 locks the chamber lid 13 in the closed position by engagement of a key portion 20a at one end thereof with an engagement portion 13a on the chamber lid 13. The engagement portion 13a is in the form of a groove formed in the free end face of the chamber lid 13.

The key member 20 is supported for rotation on the camera body 11 at an intermediate portion thereof, and the key portion 20a is formed on one end of the key member 20 and a control portion 20b is formed on the other end thereof. The control portion 20b is disposed in an arcuate guide groove 14 formed in the lower side of the camera body 11 and moved along the guide groove 14.

As shown in FIG. 2, an ejector 21 for lifting the film cartridge 1 in the cartridge chamber 12 by a predetermined amount upon opening of the chamber lid 13 is provided in the cartridge chamber 12. The ejector 21 extends in the longitudinal direction of the cartridge chamber 12 along the space into which the film cartridge 1 is inserted and is provided with a hooked end portion 21a adapted to engage with the upper end face of the cartridge body 2. The other end 21b of the ejector 21 is directed toward the entrance opening of the cartridge chamber 12 and is adapted to be abut against a protrusion 13b formed on the inner surface of the chamber lid 13. The ejector 21 is urged toward the entrance opening of the cartridge chamber 12 by a spring 22.

When the film cartridge 1 is inserted into the cartridge chamber 12 and the chamber lid 13 is closed, the ejector 21 is pushed inward overcoming the force of the spring 22 by the protrusion 13b and at the same time, the film cartridge 1 is pushed inward so that the end portion 3a of the spool 3 is brought into engagement with the drive member and the end portion 5a of the light-shielding shutter member 5 is brought into engagement with the shutter member opening/closing member. When the chamber lid 13 is opened, the ejector 21 lifts the film cartridge 1 under the force of the spring 22, whereby the film cartridge 1 is disengaged from the drive member and the shutter member opening/closing member and is projected outward from the entrance opening of the cartridge chamber 12 to facilitate take-out of the film cartridge 1.

A projection 21c is formed on the hooked end portion 21a of the ejector 21 to extend in the longitudinal direction of the ejector 21. The projection 21c interlocks with a shutter lock mechanism to be described hereinbelow.

Figure 5:
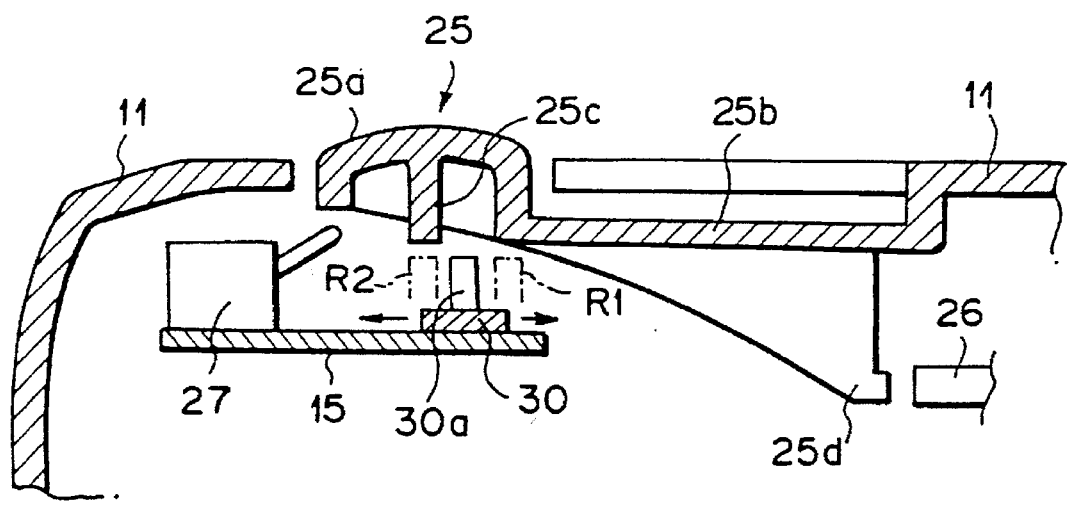
FIG. 5 is a fragmentary cross-sectional view showing a portion around the shutter release button.
Figure 6:
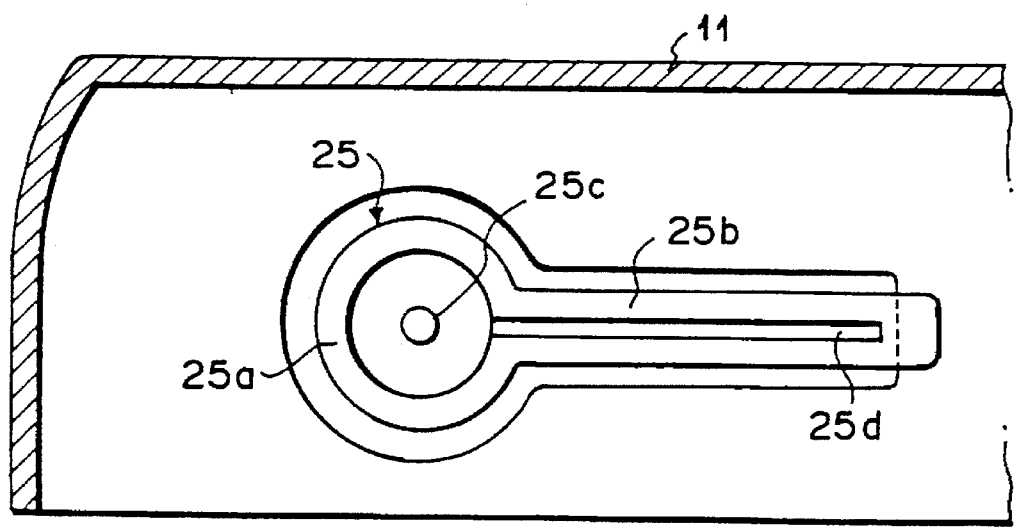
FIG. 6 is a bottom view a portion around the shutter release button.
Figure 7:
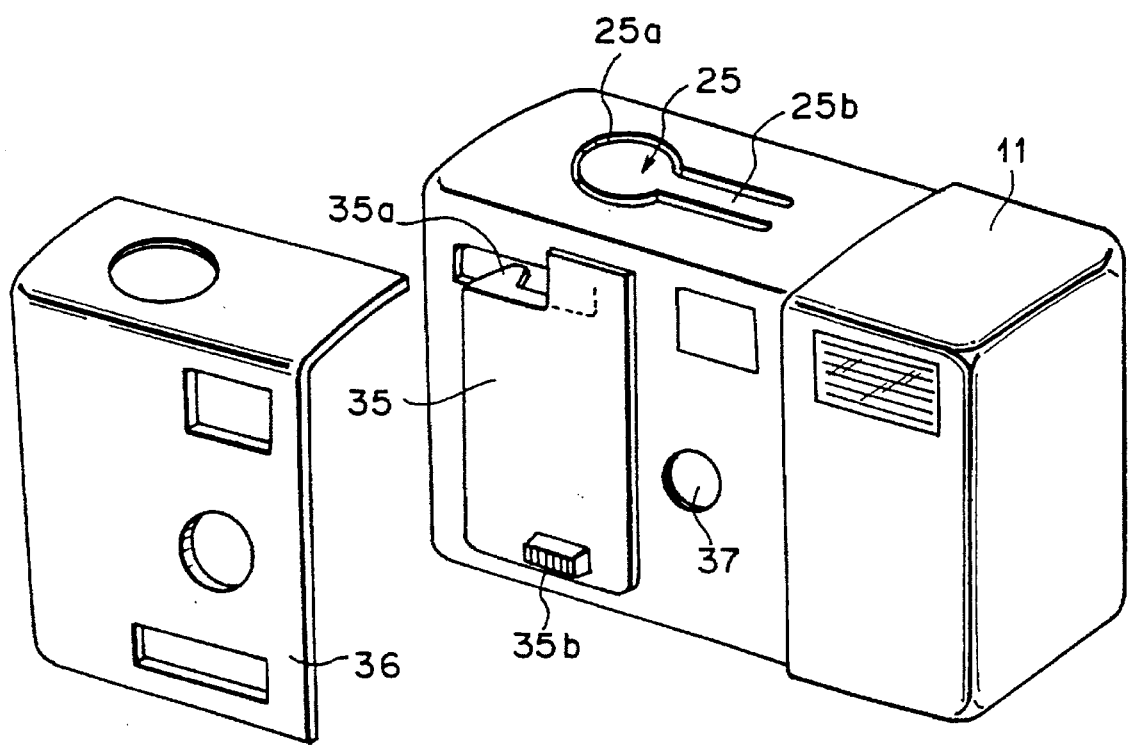
FIG. 7 is an exploded perspective view showing the front structure of the camera.

As shown in FIGS. 5 to 7, a shutter release button 25 is formed integrally with the camera body 11 (the front cover thereof) and comprises a resilient arm portion 25b connected to the camera body 11 at one end and a button portion 25a connected to the other end of the arm portion 25b. A space surrounds the button portion 25a and the arm portion 25b. A central projection 25c projects downward from the lower surface of the button portion 25a and a connecting portion 25d in the form of a plate extends downward from the lower surface of the arm portion 25b. When the button portion 25a is depressed and the arm portion 25b is deformed, the free end of the connecting portion 25d is brought into contact with an actuator piece 26 of the shutter release mechanism to release the shutter.

Below the free end of the button portion 25a, is mounted a switch 27 on an inner frame 15. In response to depression of the button portion 25a, the switch 27 is operated to control a film take-up motor and the like.

A shutter lock member 30 for preventing depression of the button portion 25a is disposed below the button portion 25a. The shutter lock member 30 is supported for rotation by a pin 32 (FIG. 3) on the inner frame 15. A boss 30a extends upward from the upper surface of the shutter lock member 30. The boss 30a is moved in response to rotation of the shutter lock member 30, and whether or not the button portion 25a can be depressed depends upon the position of the boss 30a.

That is, in the position shown by the solid line in FIG. 5, the boss 30a is opposed to a recessed portion of the button portion 25a and permits depression of the button portion 25a (release position), i.e., permits release of the shutter of the camera. In the first locking position R1 on the right side of the release position, the boss 30a is opposed to the peripheral wall of the button portion 25a and prevents depression of the button portion 25a by abutting against the lower surface of the peripheral wall of the button portion 25a. In the second locking position R2 on the left side of the release position, the boss 30a is opposed to the central projection 25c of the button portion 25a and prevents depression of the button portion 25a by abutting against the central projection 25c.

Figure 3:
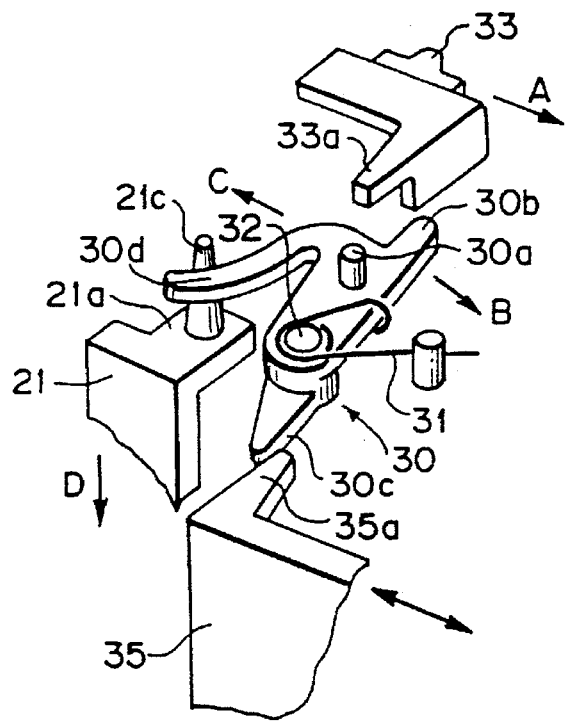
FIG. 3 is a fragmentary perspective view showing the shutter lock mechanism.

As shown in FIG. 3, the shutter lock member 30 has a first engagement portion 30b at one end and a second engagement portion 30c at the other end. A resilient arm portion 30d extends from a side surface of the shutter lock member 30. The shutter lock member 30 is urged in a reset direction by a torsion spring 31. The first engagement portion 30b is adapted to abut against a rewind button 33 and the second engagement portion 30c is adapted to abut against a barrier 33. The resilient arm portion 30d is adapted to abut against the projection 21c on the ejector 21.

That is, the rewind button 33 is mounted to slide laterally relative to the camera body 11, and an engagement projection 33a adapted to engage with the first engagement portion 30b of the shutter lock member 30 is formed on the inner end thereof. When the rewind button 33 is moved in the direction of arrow A to actuate a known rewinding mechanism (not shown), the engagement projection 33a pushes the first engagement portion 30b of the shutter lock member 30, thereby rotating the shutter lock member 30 in the direction of arrow B to bring the boss 30a to the first locking position R1.

The resilient arm portion 30d of the shutter lock member 30 is engaged with the projection 21c of the ejector 21 when the chamber lid 13 is closed and the ejector 21 is in the pushed position, and when the chamber lid 13 is opened and the ejector 21 is moved in the direction of arrow D, the arm portion 30d is disengaged from the projection 21c.

Figure 4:
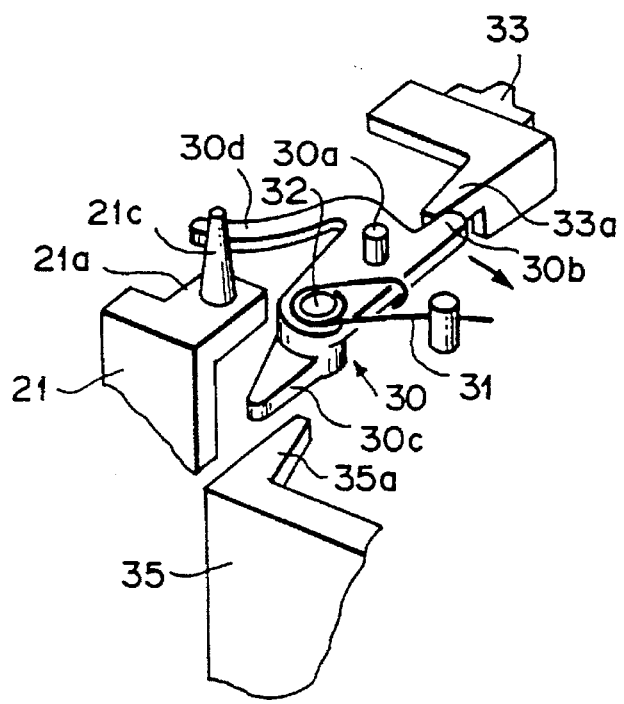
FIG. 4 is a fragmentary perspective view showing the shutter lock mechanism in the shutter locking position.

When the boss 30a is in the release position or the second locking position, the arm portion 30d is on the outer side of the projection 21c as shown in FIG. 3. During rotation of the shutter lock member 30 to bring the boss 30a to the fist locking position R1, the arm portion 30d is deformed and overrides the projection 21c and comes to engage with the projection 21c from inside of the same as shown in FIG. 4, where the arm portion 30d holds the shutter lock member 30 in the first locking position.

As shown in FIG. 7, the barrier 35 is mounted on front face of the camera body 11 to be slidable left and right, and a decorative front cover 36 is provided in front of the barrier 35. The barrier 35 has a knob 35b which protects through the decorative front cover 36 and by operating the knob 35b the barrier 35 is opened and closed. An engagement projection 35a which is adapted to engage with the second engagement portion 30c of the shutter lock member 30 is formed on the upper end of the barrier 35.

When the barrier 35 is in the closed position, the engagement projection 35a is away from the second engagement portion 30c of the shutter lock member 30, thereby permitting the shutter lock member 30 to rotate in the direction of arrow C (FIG. 3) under the force of the torsion spring 31 to bring the boss 30a to the second locking position R2. When the barrier 35 is moved to the opening position, the engagement projection 35a abuts against the second engagement portion 30c to rotate the shutter lock member 30 in the direction of arrow B to bring the boss 30a to the release position.

Figure 8:
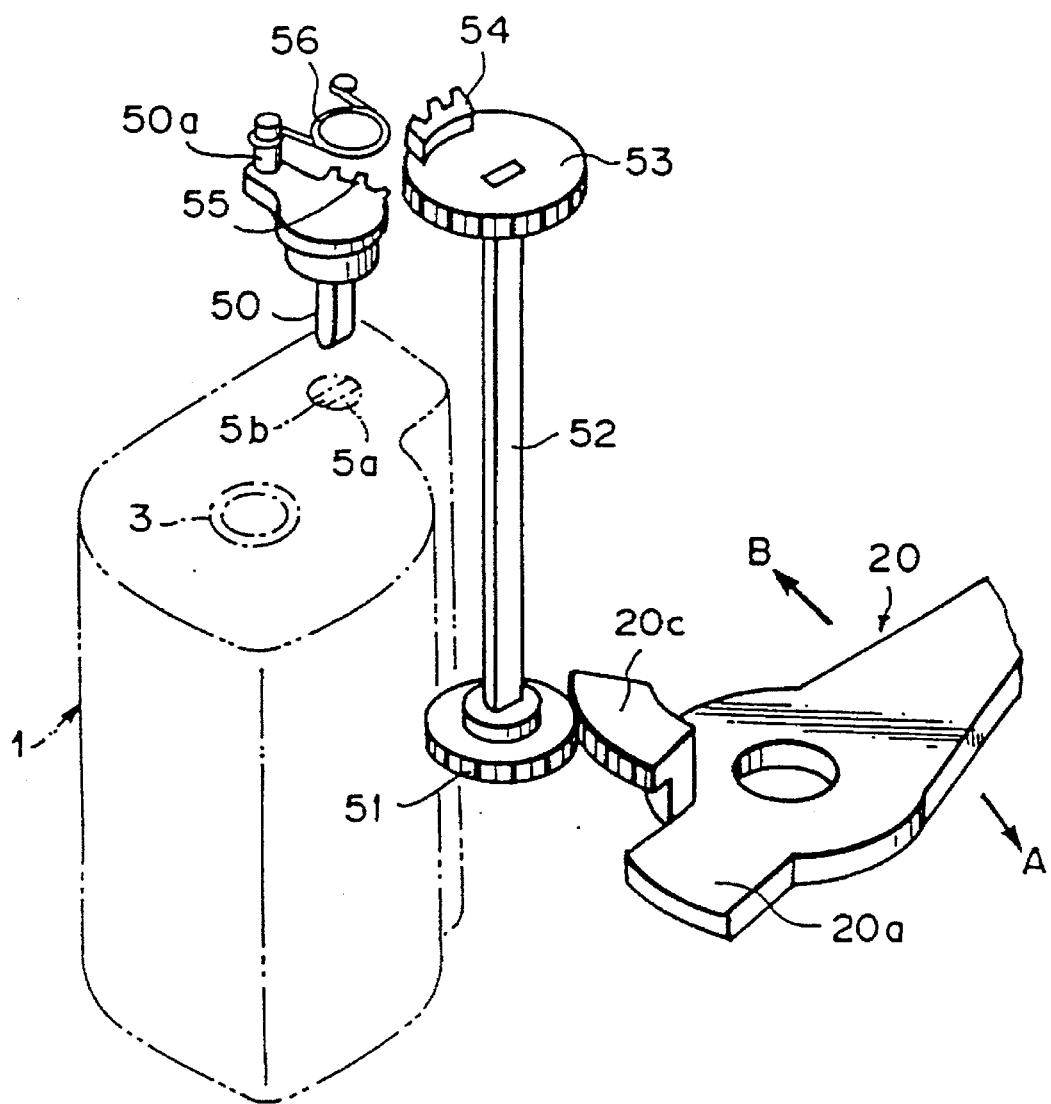
FIG. 8 is a fragmentary perspective view showing the mechanism for opening and closing the light-shielding shutter member.
Figure 9:
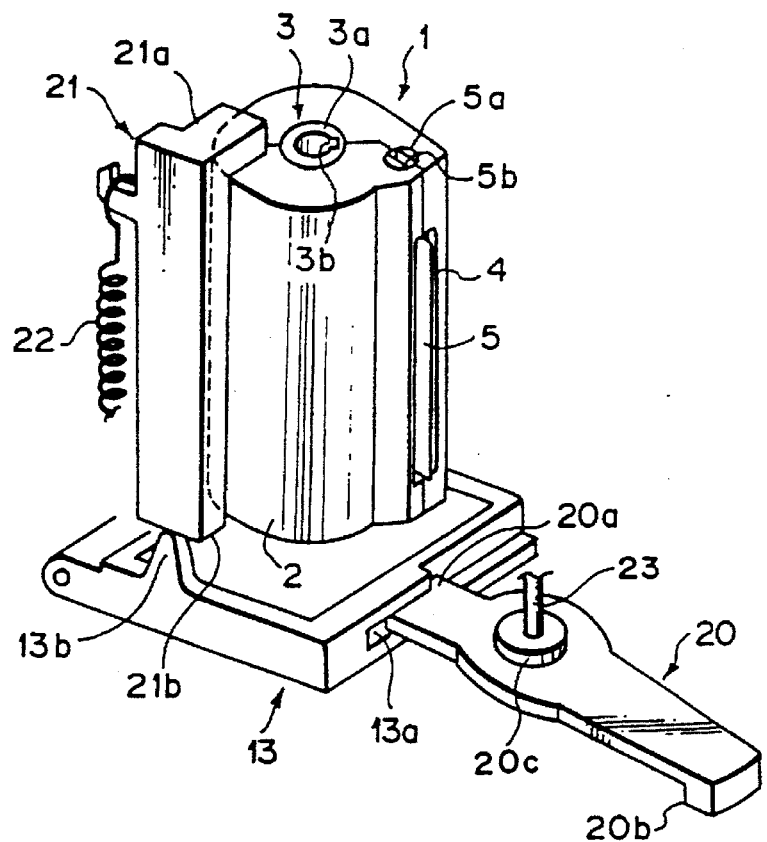
FIG. 9 is a fragmentary perspective view showing the cartridge lid lock mechanism and the ejector mechanism employed in a photographic camera in accordance with a second embodiment of the present invention.

As shown in FIG. 8, the key member 20 has a sector gear 20c adjacent to the key portion 20a. The sector gear 20c is for opening and closing the light-shielding shutter member 5 and for switching an exposure condition indicator, though the mechanism for switching the exposure condition indicator is omitted here.

The sector gear 20c is in mesh with a lower gear 51 fixed to the lower end of a shaft 52. Art upper gear 53 is fixed to the upper end of the shaft 52 and a sector gear 54 is fixed to the upper gear 53 in a predetermined position. A shutter member opening/closing member 50 is supported for rotation on an inner frame (not shown) and a lacking teeth gear 55 adapted to be engaged with the sector gear 54 is fixed to the top of the opening/closing member 50. A pin 50a is fixed to the gear 55 and one end of an ohm-shaped spring 56 is mounted on the pin 50a.

When the key member 20 is rotated in the lock release direction shown by arrow A, the lower gear 51 is rotated by the sector gear 20c and the sector gear 54 is brought into engagement with the lacking teeth gear 55, whereby the shutter member opening/closing member 50 is rotated in the shutter member closing direction. When the opening/closing member 50 is rotated beyond the neutral position of the ohm-shaped spring 56, the force of the ohm-shaped spring 56 comes to act in the closing direction, whereby the light-shielding shutter member 5 is held in the closed position under the force of the spring 56. Thereafter the chamber lid 13 is released and can be opened.

On the other hand, when the key member 20 is rotated in the locking direction shown by arrow B, the sector gear 54 is rotated in the reverse direction and rotates the opening/closing member 50 in the reverse direction. When the opening/closing member 50 is rotated in the reverse direction beyond the neutral position of the ohm-shaped spring 56, the force of the ohm-shaped spring 56 comes to act in the opening direction, whereby the light-shielding shutter member 5 is held in the opening position under the force of the spring 56.

The aforesaid spool drive member is engaged with the end portion 3a of the spool 3 and transmits rotation of a motor (not shown) to the spool 3 to rotate it in the regular and reverse directions. Further in response to movement of the key member 20 to the release position, the exposure condition indicator is switched to indicate "exposed" by way of a mechanism in mesh with the upper gear 53.

The operation of the camera in accordance with this embodiment will be described, hereinbelow. When the film cartridge 1 is inserted into the cartridge chamber 12, the chamber lid 13 is closed and the key member 20 is moved in the locking position, the projection 21c on the ejector 21 is moved to a position where it can be engaged with the resilient arm portion 30d of the shutter lock member 30 as shown in FIG. 3.

When the barrier 35 is kept closed in this state, the boss 30a of the shutter lock member 30 is in the second locking position R2 and accordingly the shutter release button 25 cannot be depressed. When the barrier 35 is opened, the shutter lock member 30 is rotated in the direction of arrow B to bring the boss 30a to the release position, thereby permitting depression of the shutter release button 25.

After the film is fed out one frame by one frame from film cartridge 1 and all the frames are exposed, the rewind button 33 is operated and the film is rewound. In response to operation of the rewind button 33, the shutter lock member 30 is further rotated in the direction of arrow B to bring the boss 30a to the first locking position R1, thereby preventing depression of the shutter release button 25. The shutter lock member 30 is held in the first locking position R1 by the arm portion 30d which overrides the projection 21c and comes to engage with the projection 21c from inside of the same during rotation of the shutter lock member 30 to the first locking position R1. When the arm portion 30d is in engagement with the projection 21c from inside, the shutter lock member 30 is prevented from rotating in the direction of arrow C. This state is held even after completion of rewinding the film.

When the key member 20 is moved to the release position to take out the film cartridge 1, the chamber lid 13 is pushed open under the force of the spring 22 of the ejector 21 and the ejector 21 is lifted by spring 22 to lift the film cartridge 1 by a predetermined amount.

When the ejector 21 is lifted, the projection 21c is disengaged from the arm portion 30d and the shutter lock member 30 is rotated in the direction of arrow C by the torsion spring 31 away from the first locking position R1. Accordingly, when a new film cartridge 1 is loaded and the barrier 35 is opened, the shutter release button 25 can be depressed.

The interlocking mechanism of the shutter lock member 30 may be variously modified. For example, the shutter lock member 30 may be reset in response to opening of the chamber lid 13 with the shutter lock member 30 set to prevent shutter release in response to operation of the rewind button 33.

A second embodiment of the present invention will be described with reference to FIGS. 9 to 12, hereinbelow. In this embodiment, the key member 20 for locking the chamber lid 13 is provided with a bearing 20c, and a pin 23 extends upward from the bearing 20c in alignment with the rotational axis of the key member 20. The pin 23 is rotated together with the key member 20.

A shutter lock member 130 is disposed below the button portion 25a of the shutter release button 25. The shutter lock member 130 is supported for sliding motion left and right on the inner frame 15 by engagement between elongated holes 130d and pins 15a. A boss 130a projects upward from the upper surface of the shutter lock member 130 at the center thereof. The boss 130a is moved in response to slide of the shutter lock member 130, and whether or not the button portion 25a can be depressed depends upon the position of the boss 130a.

Figure 12:
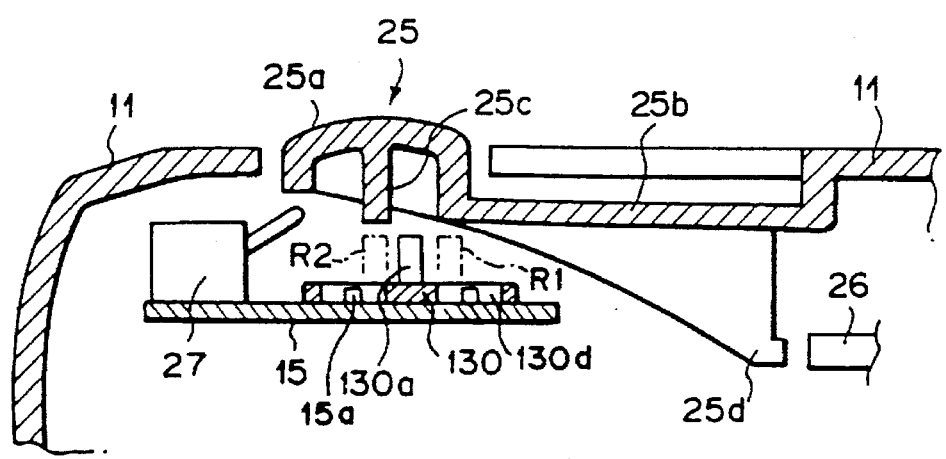
FIG. 12 is a fragmentary cross-sectional view showing a portion around the shutter release button in the camera of the second embodiment.

That is, in the position shown by the solid line in FIG. 12, the boss 130a is opposed to a recessed portion of the button portion 25a and permits depression of the button portion 25a (release position), i.e., permits release of the shutter of the camera. In the first locking position R1 on the right side of the release position, the boss 130a is opposed to the peripheral wall of the button portion 25a and prevents depression of the button portion 25a by abutting against the lower surface of the peripheral wall of the button portion 25a. In the second locking position R2 on the left side of the release position, the boss 130a is opposed to the central projection 25c of the button portion 25a and prevents depression of the button portion 25a by abutting against the central projection 25c.

Figure 10:
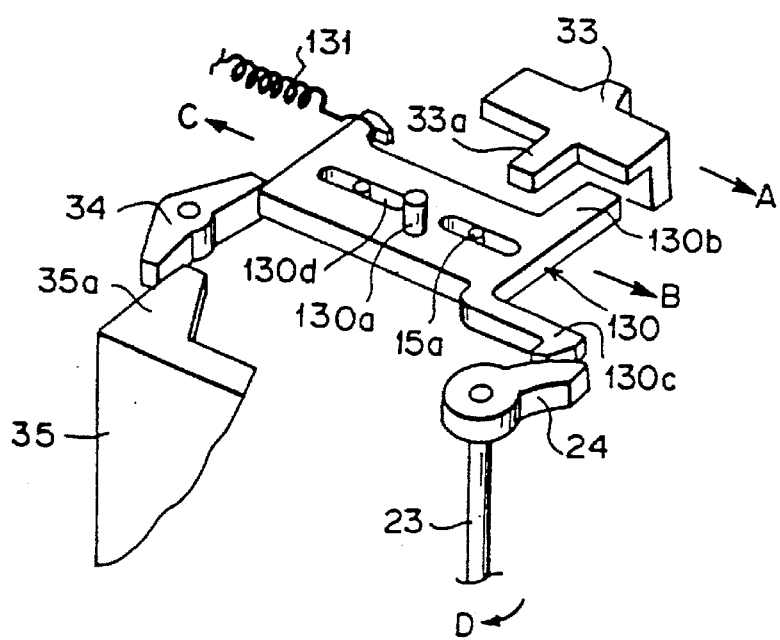
FIG. 10 is a fragmentary perspective view showing the shutter lock mechanism in the camera of the second embodiment.

As shown in FIG. 10, the shutter lock member 130 has an engagement portion 130b extending rearward and a locking hook 130c laterally extending from one end thereof. The shutter lock member 130 is urged in a reset direction by a spring 131. The engagement portion 130b is adapted to be engaged with the rewind button 33, and the locking hook 130c is adapted to be engaged with an engagement lever 24 fixed to the upper end of the pin 23 on the key member 20.

That is, the rewind button 33 is laterally slidable on the camera body 11 and is provided with an engagement projection 33a adapted to be engaged with the engagement portion 130b on the shutter lock member 130. When the rewind button 33 is moved in the direction of arrow A (FIG. 10) to rewind the film, the engagement projection 33a pushes the engagement portion 130b to slide the shutter lock member 130 in the direction of arrow B to the first locking position R1.

Figure 11:
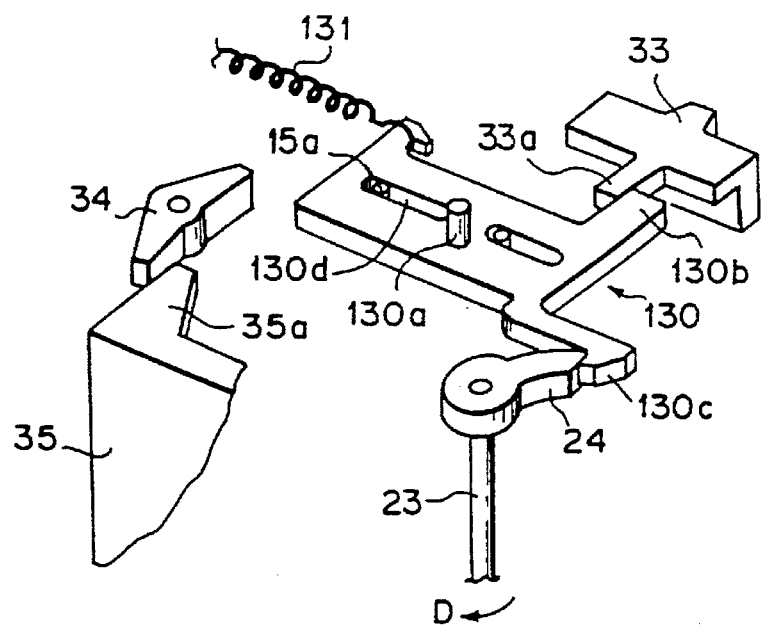
FIG. 11 is a fragmentary perspective view showing the shutter lock mechanism in the shutter locking position.

The locking hook 130c on the shutter lock member 130 can be engaged with the engagement lever 24 on the key member 20 as shown in FIG. 11 depending on the position of the engagement lever 24, and when the pin 23, or the engagement lever 24, is rotated in the direction of arrow D, the engagement lever 24 is disengaged from the locking hook 130c.

That is, when the shutter lock member 130 is in a position where the boss 130a is in the second locking position R2 or the release position, the locking hook 130c is disengaged from the engagement lever 24 as shown in FIG. 10. During sliding movement of the shutter lock member 130 in the direction of arrow B to bring the boss 130a to the fist locking position R1, the locking hook 130c and the engagement lever 24 are deformed, and the engagement lever 24 overrides the locking hook 130c and comes to engage with therewith as shown in FIG. 11. Thus the shutter lock member 130 is held in the first locking position.

The engagement projection 35a of the barrier 35, which is of the same structure in the first embodiment, is engaged with one end of the interlocking lever 34. The interlocking lever 34 is supported for rotation at an intermediate portion thereof and the other end portion of the interlocking lever 34 is adapted to be engaged with the end of the shutter lock member 130 opposite to the locking hook 130c.

When the barrier 35 is in the closed position, the engagement projection 35a is held away from the interlocking lever 34, and the shutter lock member 130 is held in the position where the boss 130a is in the second locking position R2 under the force of the spring 131. When the barrier 35 is opened, the engagement projection 35a rotates the interlocking lever 34 to push the shutter lock member 130 in the direction of arrow B to bring the boss 130a to the release position.

The operation of the camera in this embodiment will be described, hereinbelow. When a film cartridge 1 is inserted into the cartridge chamber 12 and the key member 20 is moved to the locking position after the chamber lid 13 is closed, the engagement lever 24 is brought to a position where it can be engaged with the locking hook 130c on the shutter lock member 130.

When the barrier 35 is in the closed position, the boss 130a is in the second locking position R2 and the shutter release button 25 cannot be depressed. When the barrier 35 is opened, the shutter lock member 130 is slid in the direction of arrow B to bring the boss 130a to the release position, where depression of the shutter release button 25 is permitted.

After the film is fed out one frame by one frame from film cartridge 1 and all the frames are exposed, the rewind button 33 is operated and the film is rewound. In response to operation of the rewind button 33, the shutter lock member 130 is further slid in the direction of arrow B to bring the boss 130a to the first locking position R1, thereby preventing depression of the shutter release button 25. The shutter lock member 130 is held in the first locking position R1 by the locking hook 130c which overrides the engagement lever 24 and comes to engage therewith during slide of the shutter lock member 130 to the first locking position R1. This state is held even after completion of rewinding the film.

When the key member 20 is rotated to the release position to take out the film cartridge 1, the chamber lid 13 is pushed open under the force of the spring 22 of the ejector 21 and the ejector 21 is lifted by spring 22 to lift the film cartridge 1 by a predetermined amount.

By rotation of the key member 20 to the release position, the engagement lever 24 is rotated and disengaged from the engagement hook 130a and the shutter lock member 130 is slid in the direction of arrow C by the spring 131 away from the first locking position R1. Accordingly, when a new film cartridge 1 is loaded and the barrier 35 is opened, the shutter release button 25 can be depressed.

The interlocking mechanism of the key member 20 and the shutter lock member 130 may be variously modified. For example, the shutter lock member 130 may be reset in response to lock release action of the key member 20 with the shutter lock member 130 set to prevent shutter release in response to operation of the rewind button 33.

Though, in the embodiments described above, release of the shutter is mechanically prevented, in a photographic camera in which the shutter release mechanism is controlled by a control circuit (microcomputer), the present invention can be applied by producing a program to inhibits release of the shutter of the camera during rewinding the film and after completion of rewinding the film so long as the light-shielding shutter member of the film cartridge is open.

A third embodiment of the present invention will be described with reference to FIGS. 13 to 16, hereinbelow.

In FIGS. 13 to 16, a photographic camera 210 in accordance with a third embodiment of the present invention has a cartridge chamber 212 which is for receiving a film cartridge 201 and is formed in one side of a camera body 211. The entrance opening to the cartridge chamber 212 is opened and closed by a chamber lid 213 which is supported for rotation on one end of the bottom of the camera body 211.

As shown in FIG. 14, the film cartridge 201 comprises a cartridge body 202 formed of resin molding halves bonded together and a photographic roll film (not shown) entirely rolled around a spool 203 in the cartridge body 202 to its leading end. A film exit slit 204 is formed in the side surface of the cartridge body 202 and a light-shielding shutter member 205 is supported for rotation in the film exit slit 204 to open and shut the film exit slit 204. The shutter member 205 extends in parallel to the spool 203 and is provided with a cutaway portion 205b at one end portion 205a which is exposed in the end face of the cartridge body 202 from which the film cartridge 201 is inserted into the cartridge chamber 212 (positioned down in FIG. 14; this end face will be referred to as "the upper end face", hereinbelow). The end portion 205a is engaged with a shutter member opening/closing member 232 (FIG. 15) disposed in the cartridge chamber 12 which rotates the shutter member 205 between an opening position where it opens the film exit slit 204 and a closed position where it closes the same. A cutaway portion (keyway) 203b is formed on the end portion 203a of the spool 203 which is exposed in the upper end face of the cartridge body 202. A spool driver 230 (FIG. 15) disposed deep inside the cartridge chamber 212 is engaged with the cutaway portion 203b to feed out and rewind the film.

An "unexposed" display window 206a (○ in shape) and an "exposed" display window 206b (X in shape) are formed on the lower end face of the cartridge body 202, and an exposure condition indicator (not shown) which is rotated by the spool 203 is disposed inside the windows 206a and 206b. A colored portion of the indicator in a color different from that of the cartridge body 202 is positioned in the "unexposed" display window 206a in a predetermined angular position of the indicator and the colored portion is positioned in the "exposed" display window 206b in the other angular positions of the indicator.

A part of the upper end face 203a of the cartridge body 202 is cut away to form a display portion 202a and a rotary disk 207 bearing thereon information on the film cartridge 201 is disposed inside the display portion 202a. The rotary disk 207 is rotated integrally with the spool 203 and a bar code portion is normally positioned in the display portion. When the spool 203 is rotated to bring the exposure condition indicator to a position where the colored portion thereon is opposed to the "exposed" display window 206b, a cutaway portion 207a (FIG. 16) of the rotary disk 207 is brought to the display portion 202a. An engagement member 225 to be described later is brought into engagement with the cutaway portion 207a.

A key member 220 is disposed on the lower side of the camera body 211 for locking the chamber lid 213 in its closed position. The key member 220 locks the chamber lid 213 in the closed position by engagement of a key portion 220a at one end thereof with an engagement portion 213a on the chamber lid 213. The engagement portion 213a is in the form of a groove formed in the free end face of the chamber lid 213.

The key member 220 is supported for rotation on the camera body 211 at an intermediate portion thereof, and the key portion 220a is formed on one end of the key member 220 and a control portion 220b is formed on the other end thereof. The control portion 220b is disposed in an arcuate guide groove 214 formed in the lower side of the camera body 211 and moved along the guide groove 214.

As shown in FIG. 14, an ejector 221 for lifting the film cartridge 201 in the cartridge chamber 212 by a predetermined amount upon opening of the chamber lid 213 is provided in the cartridge chamber 212. The ejector 221 extends in the longitudinal direction of the cartridge chamber 212 along the space into which the film cartridge 201 is inserted and is provided with a hooked end portion 221a adapted to engage with the upper end face of the cartridge body 202. The other end 221b of the ejector 221 is directed toward the entrance opening of the cartridge chamber 212 and is adapted to be abut against a protrusion 213b formed on the inner surface of the chamber lid 213. The ejector 221 is urged toward the entrance opening of the cartridge chamber 212 by a spring 222. The movement of the ejector 221 toward the entrance opening of the cartridge chamber 212 is limited by a stopper 211a (FIG. 15) on the camera body 211 against which the end 221b of the ejector 221 is brought into abutment.

Figure 15:
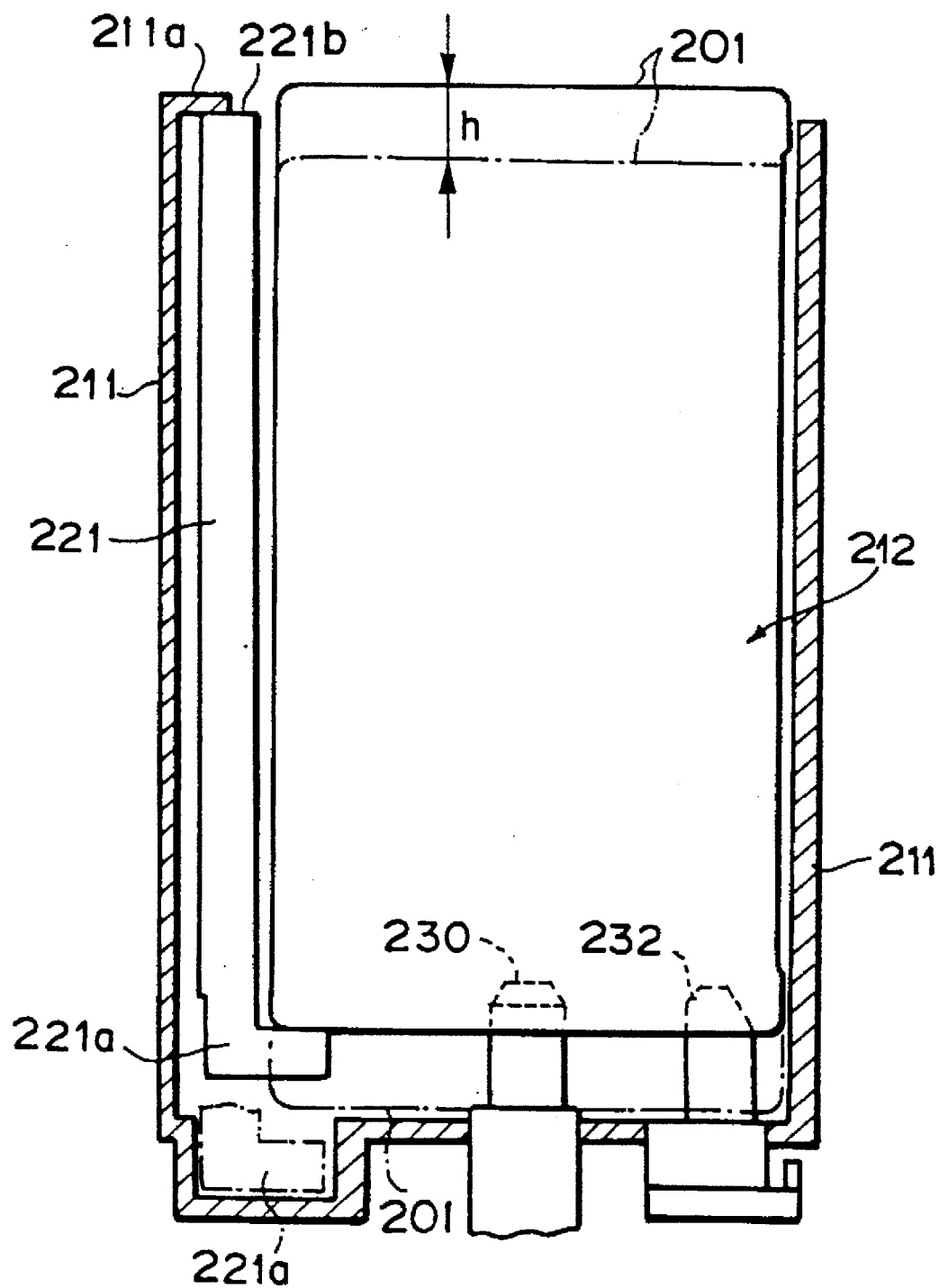
FIG. 15 is a fragmentary cross-sectional view of the cartridge chamber for illustrating the lifted position and the loaded position.

In FIG. 15, the distance h by which the ejector 221 is lifted until it abuts against the stopper 211a is a distance required to disengage the spool 203 and the light-shielding shutter member 205 from the spool driver 230 and the shutter member opening/closing member 232, and when the film cartridge 201 is inserted into the cartridge chamber 212, the film cartridge 201 rests on the ejector 221 which is in abutment against the stopper 211a, i.e., in the position lifted by the distance h from the position (shown by the chained line in FIG. 15) where the spool 203 and the light-shielding shutter member 205 are engaged with the spool driver 230 and the shutter member opening/closing member 232. The former position will be referred to as "the lifted position" and the latter position will be referred to as "the loaded position", hereinbelow. These terms will also be used with respect to the film cartridge 201. In the lifted position, the film cartridge 201 can be forced to the loaded position by simply closing the chamber lid 213. The lifted position of the film cartridge 201 is lower than a position in which the film cartridge 201 is held by the engagement member 225 as will be described later. The latter position will be referred to as "the engaged position", hereinbelow. That is, in the engaged position, the film cartridge 201 projects outward from the entrance opening of the cartridge chamber 212 longer than in the lifted position, thereby facilitating take-out of the film cartridge 201. In the loaded position, the outer end 221b of the ejector 221 is in abutment against the protrusion 213b on the chamber lid 213 and the hooked end portion 221a is away from the upper end face 203a of the cartridge body 202.

The force of the ejector spring 222 is set so that when the chamber lid 213 is opened, the film cartridge 201 is jumped toward the entrance opening of the cartridge chamber 212 beyond the lifted position to a position higher than the free end of the engagement member 225 but is not jumped outside the cartridge chamber 212.

Figure 16:
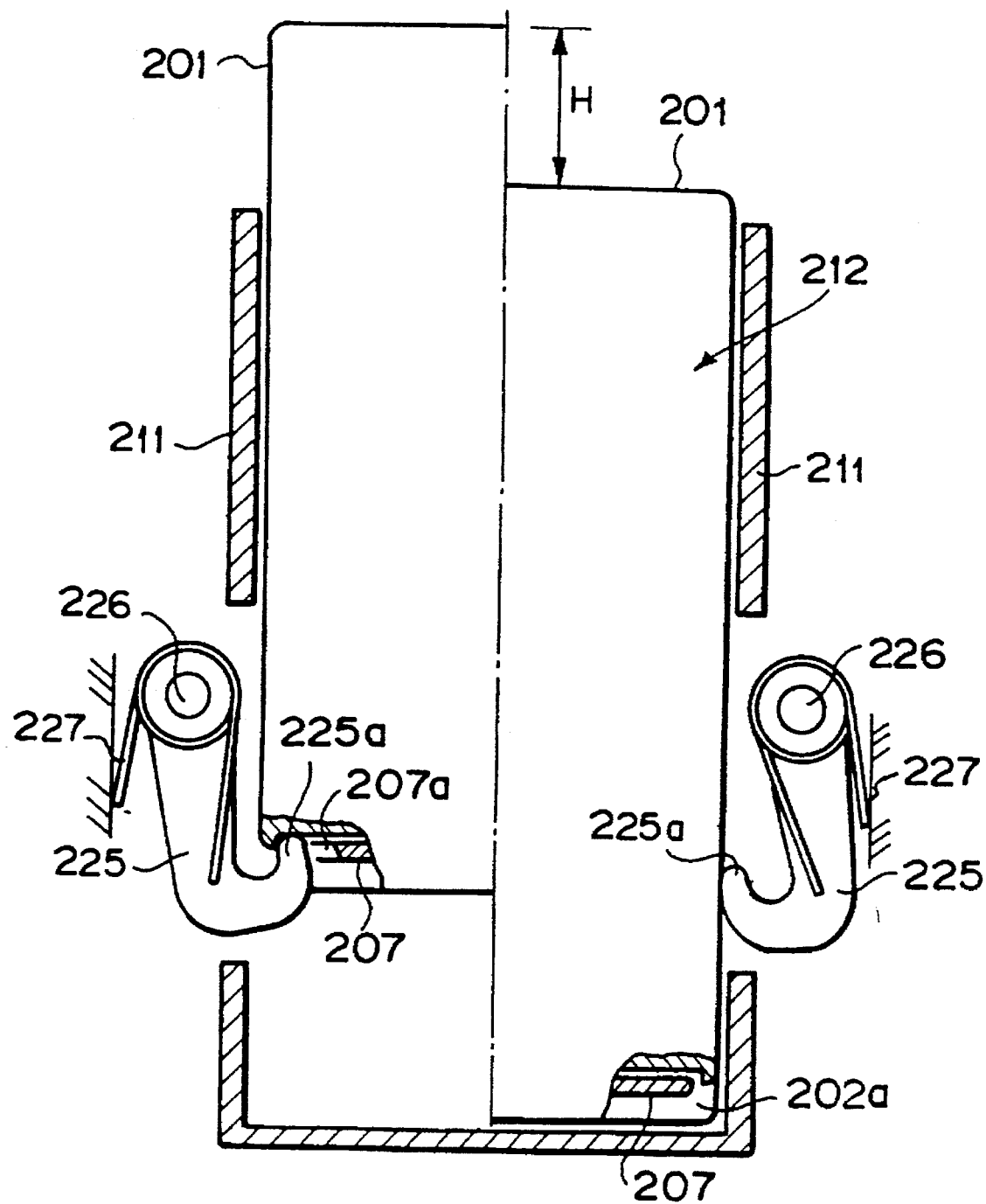
FIG. 16 is a schematic cross-sectional view of the cartridge chamber with different states of the engagement member shown on the left and right sides thereof.
Figure 17:
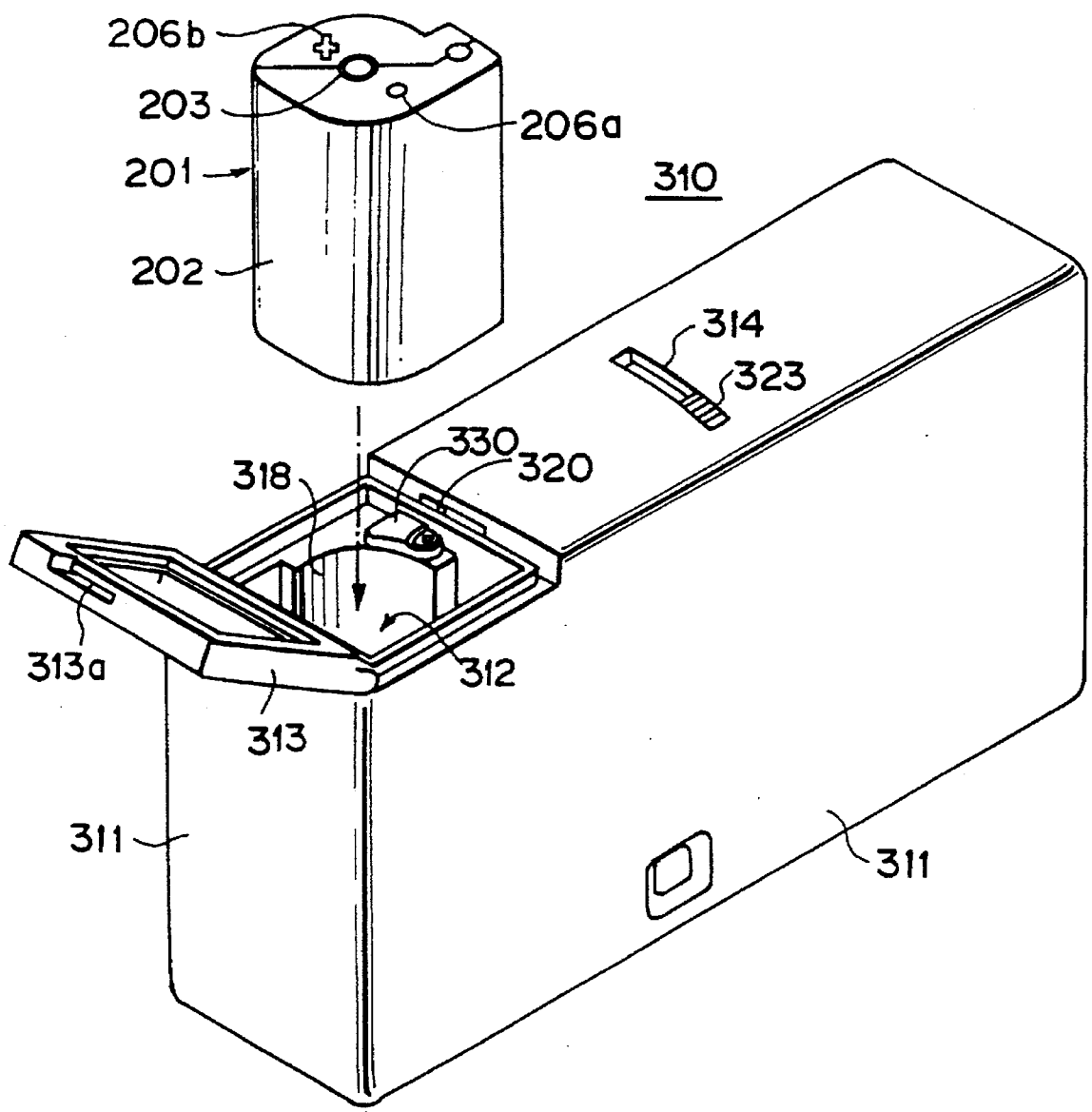
FIG. 17 is a perspective view showing a photographic camera upside down in accordance with a fourth embodiment of the present invention.

The engagement member 225 is supported for rotation on one side of the cartridge chamber 212 as shown on each of the left and right sides of FIG. 16. The engagement member 225 is like a hook and supported for rotation by a pin 26 at its upper end. The free end 225a of the hooked lower portion is directed toward the entrance opening of the cartridge chamber 212, i.e., upward as seen in FIG. 16. The free end 225a is adapted to engage with the cutaway portion 207a of the rotary disk 207 described above. The engagement member 225 is urged by a torsion spring 227 so that the free end 225a projects into the cartridge chamber 212.

The left side of FIG. 16 shows a state where the exposed film cartridge 201 is held in the engaged position by engagement of the free end 225a of the engagement member 225 with the cutaway portion 207a of the rotary disk 207 which has been brought to the display portion 202a. In this state, the film cartridge 201 cannot be forced to the loaded position. Further the distance H from the loaded position is larger than that h of the lifted position. Accordingly the film cartridge 201 projects outward from the entrance opening of the cartridge chamber 212 longer than in the lifted position, thereby facilitating take-out of the film cartridge 201.

The right side portion of FIG. 16 shows the state where an unexposed film cartridge 201 is in the loaded position. In the unexposed film cartridge 201, the bar code portion of the rotary disk 207 is in the display portion 202a and the upper surface (disposed down in FIG. 16) of the film cartridge 201 is flat. Accordingly when the upper surface of the film cartridge 201 is brought into contact with the free end 225a of the engagement member 225 as the film cartridge 201 is inserted into the cartridge chamber 212, the free end 225a cannot engage with the film cartridge 201 and rotated outward, whereby the film cartridge 201 can be rested on the ejector 221 in the lifted position. When the ejector 221 is in the lifted position, the film cartridge 201 can be easily forced to the loaded position by simply closing the chamber lid 213.

The operation of the camera of this embodiment will be described, hereinbelow.

Figure 13:
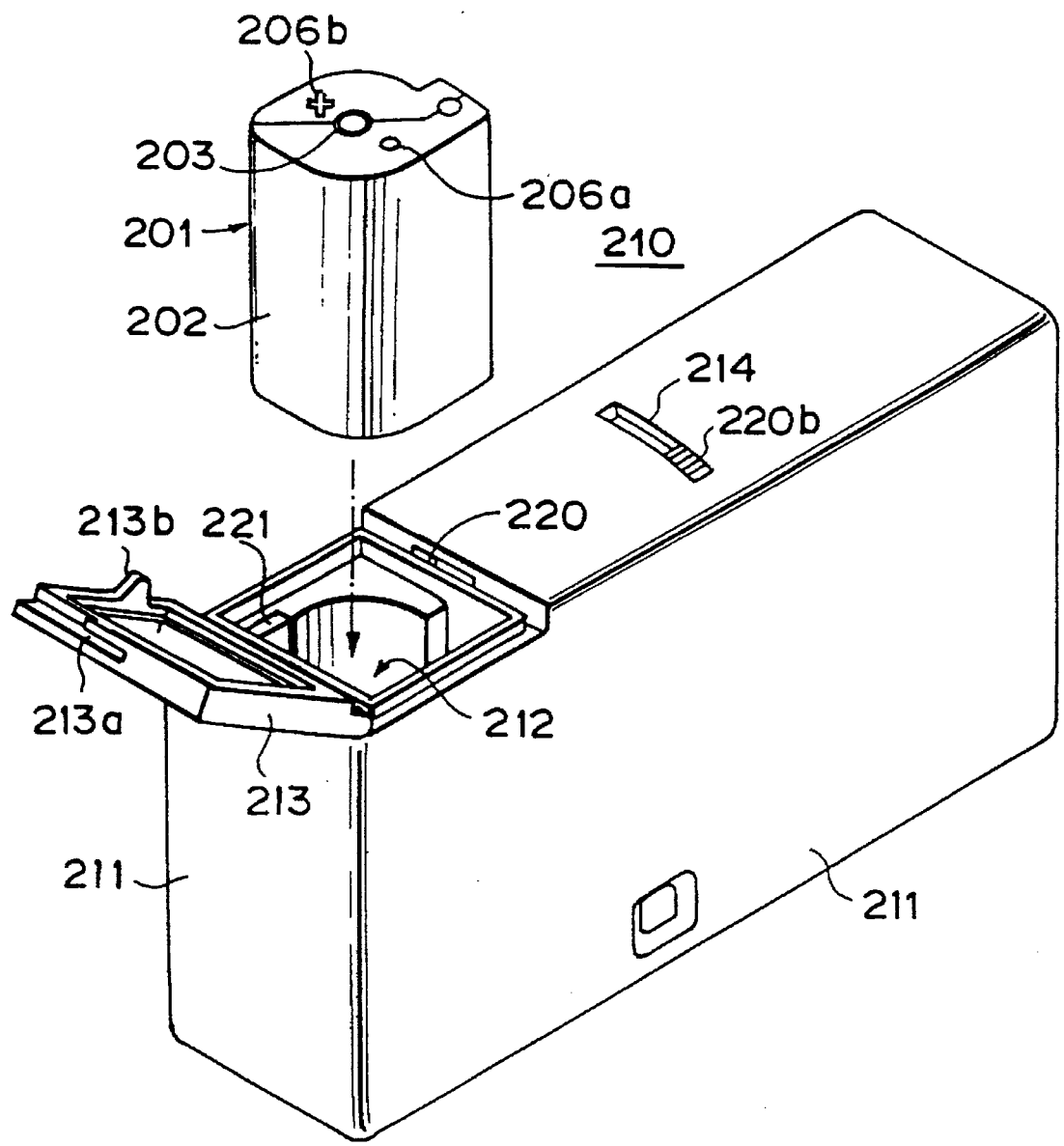
FIG. 13 is a perspective view showing a photographic camera upside down in accordance with a third embodiment of the present invention.

When an unexposed film cartridge 201 is inserted into the cartridge chamber 212 in the state shown in FIG. 13, the film cartridge 201 comes to rest on the hooked end portion 221a of the ejector 221 without interference with the engagement member 225 as described, that is, the film cartridge 201 is stopped in the lifted position. Then when the chamber lid 213 is closed, the ejector 221 is pushed inward by the protrusion 213b on the chamber lid 213 and at the same time the film cartridge 201 is forced, by a spool pressing member (not shown) on the inner surface of the chamber lid 213, to the loaded position, where the spool 203 and the light-shielding shutter member 205 are engaged with the spool driver 230 and the shutter member opening/closing member 232.

When the film is rewound after predetermined number of exposures and the key member 220 is moved to the release position to take out the film cartridge 201, the chamber lid 213 is pushed open under the force of the ejector spring 222 and the film cartridge 201 is jumped toward the entrance opening of the cartridge chamber 212 beyond the lifted position to a position higher than the engagement position with the spool 203 and the light-shielding shutter member 205 disengaged from the spool driver 230 and the shutter member opening/closing member 232.

Since the spool 203 has been rotated to the aforesaid predetermined position where the exposure condition indicator indicates "exposed" and the cutaway portion 207a is positioned in the display portion, the jumped film cartridge 201 is brought into engagement with the engagement member 225 and is held in the engaged position higher than the lifted position.

The structure of the engagement member 225 and the structure of the engagement portion of the film cartridge 201 which comes to be able to engage with the engagement member 225 in response to switching the exposure condition indicator to indicate "exposed" may be variously modified.

A fourth embodiment of the present invention will be described with reference to FIGS. 17 to 22, hereinbelow.

In FIGS. 17 to 22, a photographic camera 310 in accordance with a fourth embodiment of the present invention has a cartridge chamber 312 which is for receiving a film cartridge 201 and is formed in one side of a camera body 311. The entrance opening to the cartridge chamber 312 is opened and closed by a chamber lid 313 which is supported for rotation on one end of the bottom of the camera body 311.

The film cartridge 201 is substantially the same as that shown in FIGS. 13 and 14 and accordingly the parts analogous to those shown in FIGS. 13 and 14 are given the same reference numerals and will not be described here. It should be noted that the position of said colored portion of the indicator is set on the basis of the position of the cutaway portion 203b of the spool 203 and the colored portion is positioned in the "exposed" display window 206b by rotating the spool 203 to a predetermined angular position in response to movement of a key member 320 (to be described below) to a release position.

A key member 320 is disposed on the lower side of the camera body 311 for locking the chamber lid 313 in its closed position. The key member 320 locks the chamber lid 313 in the closed position by engagement of a key portion 321 (FIGS. 18 to 21) at one end thereof with an engagement portion 313a on the chamber lid 313. The engagement portion 313a is in the form of a groove formed in the free end face of the chamber lid 313.

The key member 320 is supported for rotation on the camera body 311 at a support hole 322 formed in the base portion of an arm 320a thereof, and the key portion 321 is formed on one end of the key member arm 32a near the support hole 322 and a control portion 323 is formed on the other end thereof. A cam groove 324 is formed on the end portion near the support hole 322 to extend laterally.

As shown in FIG. 18, the camera body 311 comprises an outer casing member 315, an inner casing member 316 forming the cartridge chamber 312 and the like and an inner frame member 317, and the key member 320 is supported on a projection 317a formed on the inner frame member 317 between the inner frame 317 and the outer casing member 315. The control portion 323 of the key member 320 is disposed in an arcuate guide groove 314 (FIG. 17) formed in the lower side of the outer casing member 315 and moved along the guide groove 314. The locking position of the key member 320 is at the front end of the guide groove 314 and the release position of the key member 320 is at the rear end of the guide groove 314.

Figure 20:
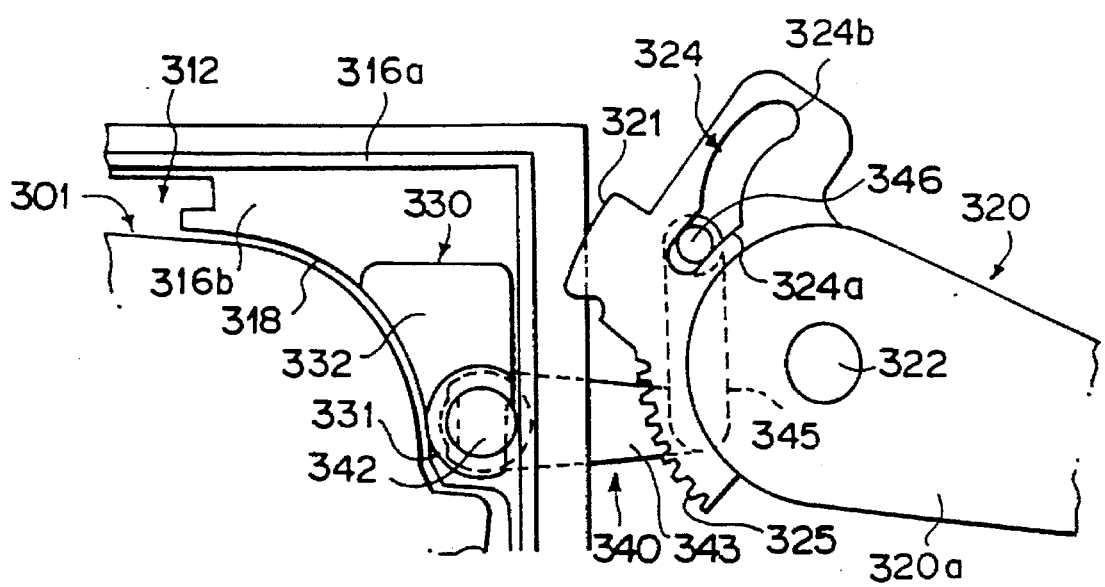
FIG. 20 is a fragmentary plan view of an important part of the camera shown in FIG. 17 with the key member in the release position.

As shown in FIG. 20, the cam groove 324 in the key member 320 comprises an inner portion 324a in the form of a short segment coaxial with the support hole 322 and an outer portion 324b extending away from the center of the support hole 322.

The cartridge chamber 312 is defined by the inner casing member 316 and is surrounded by a light-shielding vertical wall 316a. A plate member 316b having a flat outer surface and a cartridge insertion opening 318 substantially equal to the contour of the film cartridge 201 in shape is provided inside the vertical wall 316a. A through hole 319 (FIG. 19) is provided in the plate member 316 beside the cartridge chamber 312 and an insertion inhibiting member 330 is supported for rotation in the through hole 319.

The insertion inhibiting member 330 has a shaft portion 331 passed through the through hole 319 and a sectorial inhibiting portion 332 on one end of the shaft portion 331. The inhibiting portion 332 is rotated between an inhibiting position (FIG. 20) where it projects into the cartridge insertion opening 318 and inhibits insertion of the film cartridge 201 into the cartridge chamber 312 and a retracted position (FIG. 21) where it is retracted from the cartridge insertion opening 318 and permits insertion of the film cartridge 201 into the cartridge chamber 312. The end portion of the shaft portion 331 opposite to the inhibiting portion 332 which projects from the inner surface of the plate member 316b is formed into a connecting key 331a. A through hole 333 extends through the shaft portion 331 in the longitudinal direction thereof.

The key member 320 and the insertion inhibiting member 330 are connected by a connecting member 340. The connecting member 340 has a shaft portion 341. An engagement hole 341a adapted to be engaged with the connecting key 331a on the shaft portion 331 of inhibiting member 330 is formed in the upper end portion of the shaft portion 341. Further a threaded hole 341b is formed in the upper end portion of the shaft portion 341 from the bottom of the engagement hole 341a and the shaft portion 341 is fixed to the inhibiting member 330 by a bolt 342 (FIG. 18). As shown in FIG. 19, a first lever portion 343 extends horizontally from the shaft portion 341 and a rod portion 344 extends upward from the free end of the first lever portion 343. The rod portion 344 extends through the inner frame member 317 toward the key member 320. A second lever portion 345 extends horizontally from the top of the rod portion 344 substantially in perpendicular to the first lever portion 343. An engagement pin 346 extends upward from the free end of the second lever portion 345 and is engaged with the cam groove 324 in the key member 320.

Figure 22:
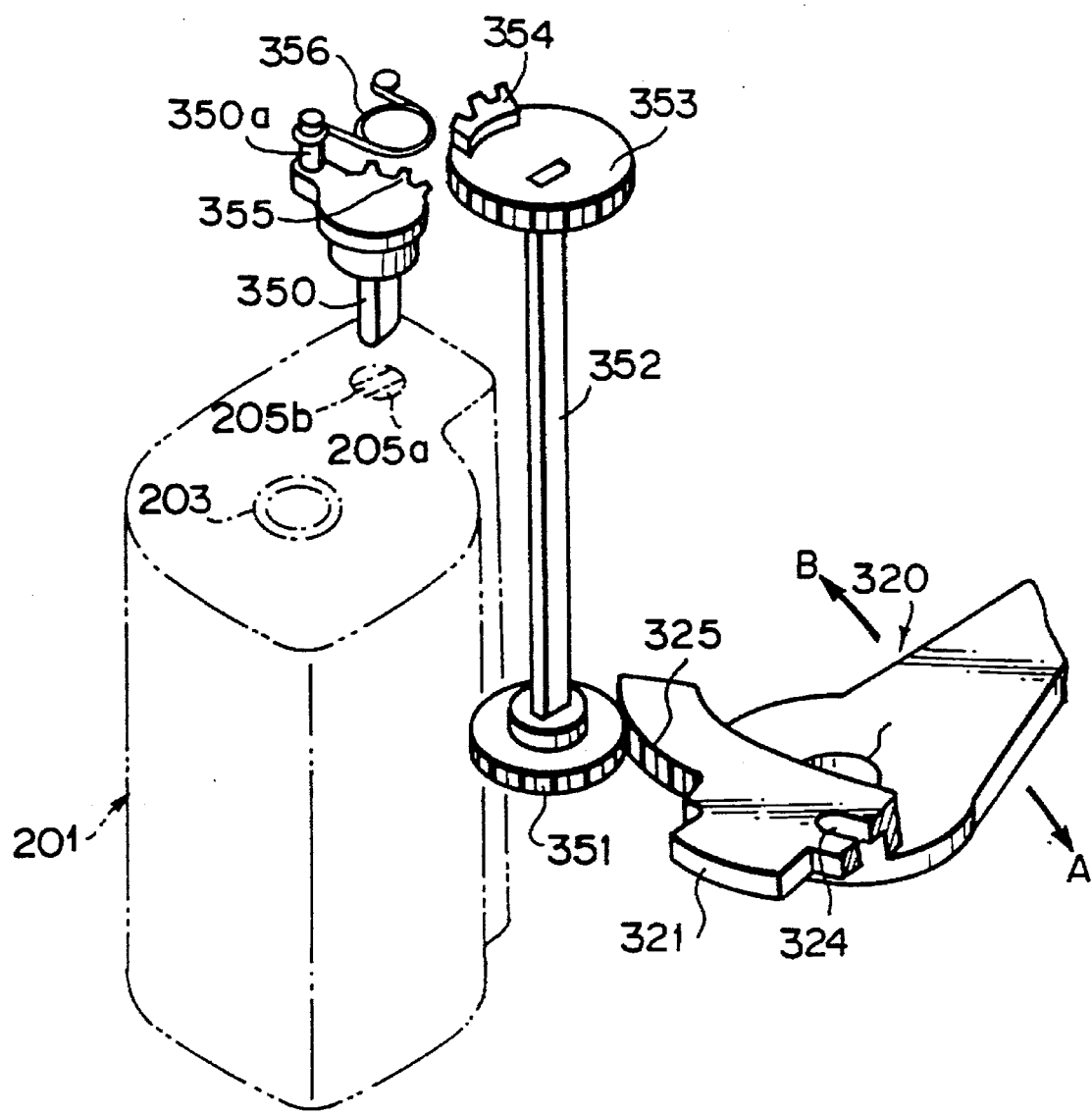
FIG. 22 is a perspective view showing the light-shielding shutter member opening and closing mechanism.

As shown in FIG. 22, the key member 320 has a sector gear 325 adjacent to the key portion 321. The sector gear 325 is for opening and closing the light-shielding shutter member 205 and for switching an exposure condition indicator, though the mechanism for switching the exposure condition indicator is omitted here.

The sector gear 325 is in mesh with a lower gear 351 fixed to the lower end of a shaft 352. An upper gear 353 is fixed to the upper end of the shaft 352 and a sector gear 354 is fixed to the upper gear 353 in a predetermined position. A shutter member opening/closing member 350 is supported for rotation on an inner frame (not shown) and a lacking teeth gear 355 adapted to be engaged with the sector gear 354 is fixed to the top of the opening/closing member 350.

A pin 350a is fixed to the gear 355 and one end of an ohm-shaped spring 356 is mounted on the pin 350a.

When the key member 320 is rotated in the locking direction shown by arrow A, the lower gear 351 is rotated by the sector gear 325 and the sector gear 354 is brought into engagement with the lacking teeth gear 355, whereby the shutter member opening/closing member 350 is rotated in the shutter member opening direction. When the opening/closing member 350 is rotated beyond the neutral position of the ohm-shaped spring 356, the force of the ohm-shaped spring 356 comes to act in the opening direction, whereby the light-shielding shutter member 205 is held in the opening position under the force of the spring 356.

On the other hand, when the key member 320 is rotated in the lock release direction shown by arrow B, the sector gear 354 is rotated in the reverse direction and rotates the opening/closing member 350 in the reverse direction. When the opening/closing member 350 is rotated in the reverse direction beyond the neutral position of the ohm-shaped spring 356, the force of the ohm-shaped spring 56 comes to act in the closing direction, whereby the light-shielding shutter member 205 is held in the closed position under the force of the spring 356. In this position or phase of the opening/closing member 350, the opening/closing member 350 is engaged with and disengaged from the cutaway portion 205b of the light-shielding shutter member 205.

The aforesaid spool drive member is engaged with the end portion 203a of the spool 203 and transmits rotation of a motor (not shown) to the spool 203 to rotate it in the regular and reverse directions. Further in response to movement of the key member 320 to the release position, the exposure condition indicator is switched to indicate "exposed" by way of a mechanism in mesh with the upper gear 353.

The operation of the camera in accordance with this embodiment will be described, hereinbelow. FIG. 20 shows a state where the key member 320 is in the lock release position to permit opening the chamber lid 313 and FIG. 21 shows a state where the key member 320 is in the locking position preventing the chamber lid 312 from being opened.

In the release position shown in FIG. 20, the key portion 321 of the key member 320 is away from the engagement portion 313a of the chamber lid 313 and the engagement pin 346 of the connecting member 340 is inner portion 324a of the cam groove 324 of the key member 320 near the support hole 322. In this state, the inhibiting portion 332 of the inhibiting member 330 is retracted from the cartridge insertion opening 318 to permit insertion and take-out of the film cartridge 201.

Figure 21:
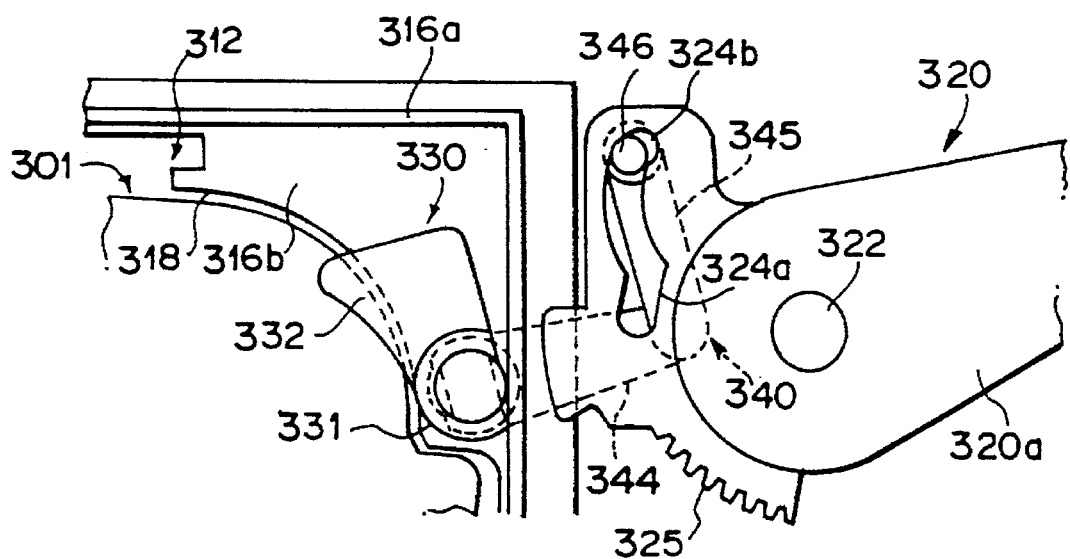
FIG. 21 is a fragmentary plan view of an important part of the camera shown in FIG. 17 with the key member in the locking position.

In the locking position shown in FIG. 21, the key portion 321 of the key member 320 is in engagement with the engagement portion 313a of the chamber lid 313 which has been closed, and the engagement pin 346 of the connecting member 340 is in the outer end of the outer portion 324b of the cam groove 324 remote from the support hole 322. In this state, the inhibiting portion 332 projects into the cartridge insertion opening 318.

Accordingly when the key member 320 is moved to the locking position by accident or the like after the chamber lid 313 is opened and the film cartridge 201 is taken out, the inhibiting portion 332 prevents a film cartridge 201 from being inserted into the cartridge chamber 312.

So long as the inhibiting portion 332 is retracted away from the insertion opening 318 and insertion of the film cartridge 201 is permitted, the opening/closing member 350 is in a predetermined position where it can be engaged with the cutaway portion 205b of the light-shielding shutter member 205 in a proper phase.

The mechanism for interlocking the inhibiting member 330 with the key member 320 is advantageous in that since the shaft portion 331 of the inhibiting member 330 extends outside the cartridge chamber 312 through the through hole 319, the film fed out from the film cartridge 201 can be easily shielded from light.

Figure 24:
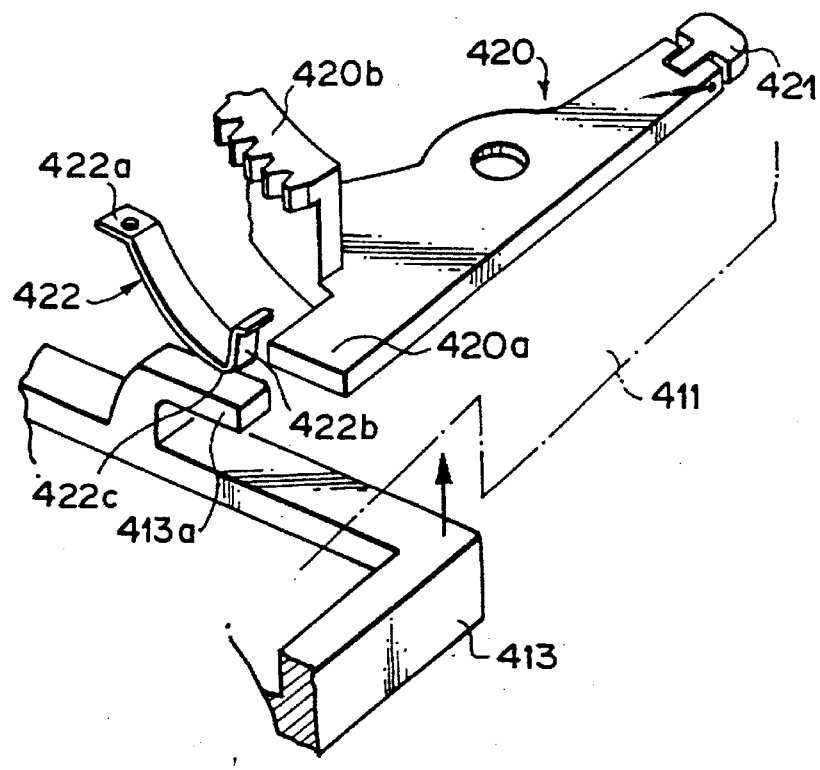
FIG. 24 is a fragmentary perspective view of an important part of the camera shown in FIG. 23 with the key member in the release position.
Figure 25:
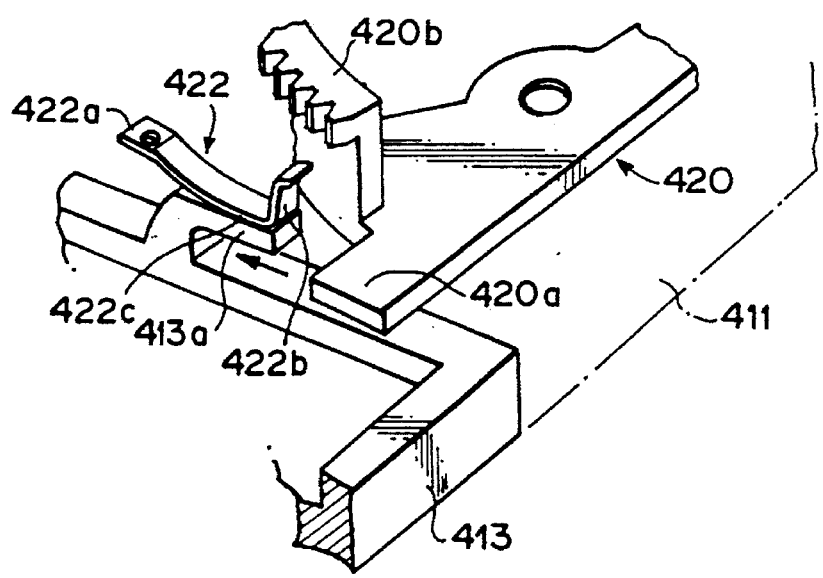
FIG. 25 is a fragmentary perspective view of the part shown in FIG. 24 with the chamber lid closed.

A fifth embodiment of the present invention will be described with reference to FIGS. 23 to 25, hereinbelow.

Figure 23:
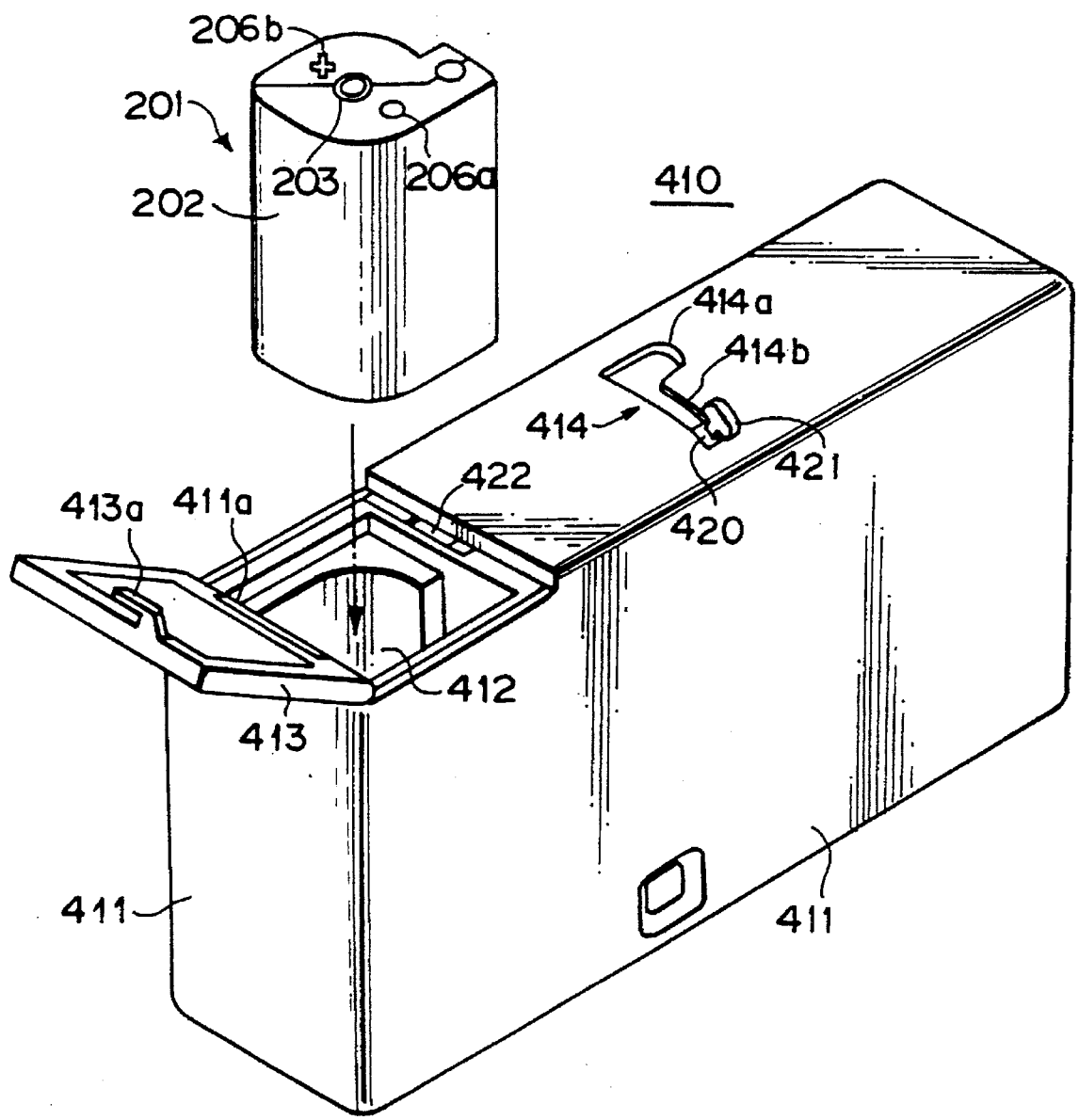
FIG. 23 is a perspective view showing a photographic camera upside down in accordance with a fifth embodiment of the present invention.

In FIG. 23, a photographic camera 410 in accordance with a fifth embodiment of the present invention has a cartridge chamber 412 which is for receiving a film cartridge 201 and is formed in one side of a camera body 411. The entrance opening to the cartridge chamber 412 is opened and closed by a chamber lid 413 which is supported for rotation on one end of the bottom of the camera body 411.

The film cartridge 201 is substantially the same as that shown in FIGS. 13 and 14 and accordingly the parts analogous to those shown in FIGS. 13 and 14 are given the same reference numerals and will not be described here. It should be noted that the position of said colored portion of the indicator is set on the basis of the position of the cutaway portion 203b of the spool 203 and the colored portion is positioned in the "exposed" display window 206b by rotating the spool 203 to a predetermined angular position in response to movement of a key member 420 (to be described below) to a release position.

A key member 420 is disposed on the lower side of the camera body 411 for locking the chamber lid 413 in its closed position. The key member 420 locks the chamber lid 413 in the closed position by engagement of a key portion 420a (FIG. 24) at one end thereof with an engagement portion 413a on the chamber lid 413. The engagement portion 413a is in the form of a keyway formed in the free end face of the chamber lid 413. The engagement portion 413a is inserted into an opening formed on the side of the entrance opening remote from the chamber lid 413 when the chamber lid 413 is closed and is engaged with the key portion 420a.

The key member 420 is supported for rotation on the camera body 411 at an intermediate portion thereof, and the key portion 420a is formed on one end of the key member 420. An erectable knob 421 is connected to the other end of the key member 420. The knob 421 is disposed in an L-shaped guide groove 414 formed in the lower side of the camera body 411. The guide groove 414 comprises an arcuate portion 414b and an end portion 414a substantially perpendicular to the arcuate portion 414b. In the end portion 414a, the knob 421 can be erected and flattened and along the arcuate portion 414b, the knob 421 is moved in an erected state. The key member 420 locks the chamber lid 413 in the closed position when the knob 421 is in the end portion 414a (locking position) and release the chamber lid 413 to permit opening of the chamber lid 413 when the knob 421 is in the end of the arcuate portion 414b remote from the end portion 414a (release position).

A key member lock member 422 is disposed beside the key portion 420a. The lock member 422 is adapted to abut against the engagement portion 413a when the chamber lid 413 is closed. The lock member 422 is formed of a resilient plate and is fixed to the camera body 411 at one end 422a thereof. The other end of the lock member 422 forms a lock portion 422b and the intermediate portion forms an interlocking portion 422c. When the interlocking portion 422c is away from the chamber lid 413, the lock portion 422b is positioned in front of the key portion 420 and interferes with the key portion 420a to prevent movement of the key member 420. When the interlocking portion 422c is brought into abutment against the chamber lid 413, it is deformed inward, thereby retracting the lock portion 422b away from the key portion 420a to permit movement thereof.

The key member 420 is interlocked with the shutter member opening/closing member and the spool driver by way of a mechanism similar to that shown in FIG. 8.

The operation of the camera in accordance with this embodiment will be described, hereinbelow.

When the chamber lid 413 is open, the key portion 420a of the key member 420 is in the release position away from the engagement portion 413a of the chamber lid 413. In this state, the lock portion 422b of the lock member 422 is in front of the key portion 420a to hold the key member 420 in the release position, whereby the shutter member opening/closing member is held in a predetermined position where it can be engaged with the cutaway portion of the light-shielding shutter member in a proper phase.

When the chamber lid 413 is closed, the engagement portion 413a of the chamber lid 413 abuts against the interlocking portion 422c and deforms it inward of the camera body 411, whereby the lock portion 422b is retracted away from the key portion 420a to permit the key portion 420a to be moved to the locking position where it engages with the engagement portion 413a of the chamber lid 413 to lock the chamber lid 413 in the closed position.

When the key member 420 is moved to the release position and the chamber lid 413 is opened, the interlocking portion 422c is released and the lock portion 422b projects in front of the key portion 420a to hold the key member 420 in the release position again.

A sixth embodiment of the present invention will be described with reference to FIGS. 26, 27A and 27B, hereinbelow. The sixth embodiment mainly differs from the fifth embodiment in the structure of the key member lock member and accordingly elements analogous to those in the fifth embodiment are given the same reference numerals and will not be described here.

Figure 26:
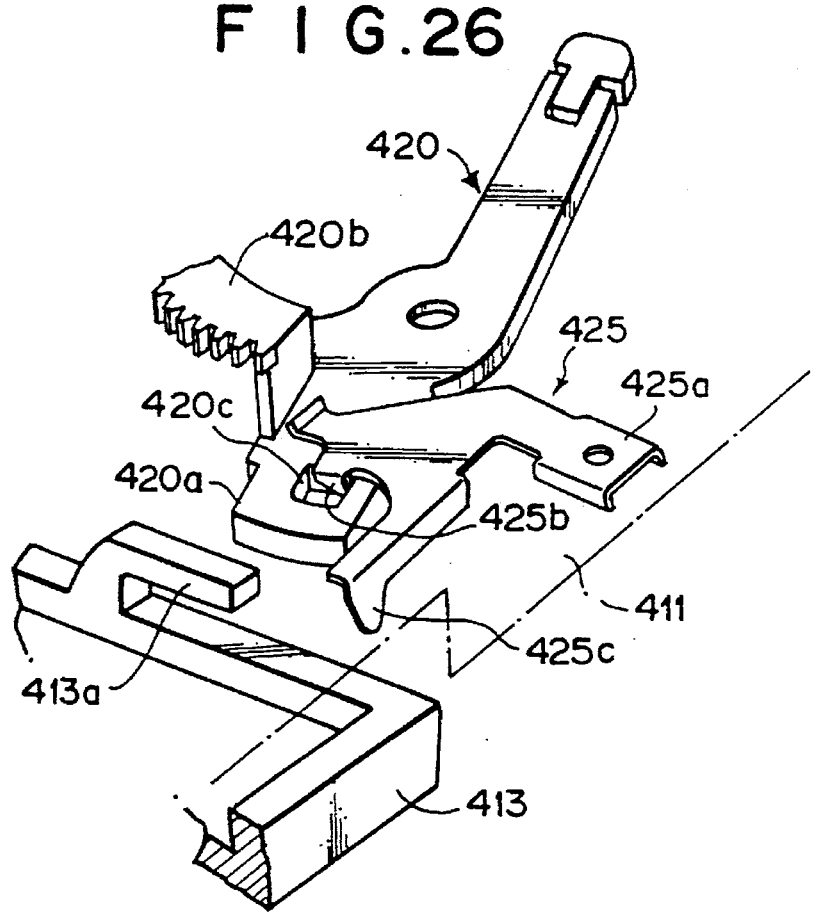
FIG. 26 is a fragmentary perspective view of an important part of a camera in accordance with a sixth embodiment of the present invention.

As shown in FIG. 26, a key member lock member 425 is formed of a spring plate and is fixed to the camera body at a base end portion 425a. An arm portion extends over the key portion 420a of the key member 420 from the base end portion 425a and a hooked lock portion 425b extends downward from the free end portion of the arm portion. Another arm portion extends toward the chamber lid 413 and an interlocking portion 425b extends downward from the free end portion thereof. The arm portions are resiliently rotatable up and down about the base end portion 425a. The edge of the arm portion of the interlocking portion 425b is bent downward to increase rigidity thereof so that the lock portion 425b can be displaced in response to displacement of the interlocking portion 425c without the interlocking portion 425b itself being deformed.

Figure 27A:
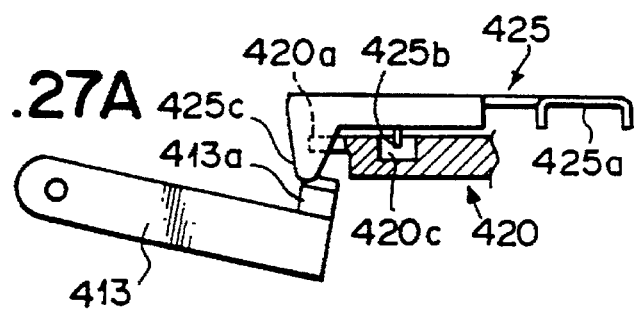
FIGS. 27A and 27B are schematic views for illustrating the operation of the camera.

In the state shown in FIGS. 26 and 27A, the key member 420 is in the release position and the lock portion 425b is engaged with an engagement recess 420c formed in the key portion 420a to hold the key member 420 in the release position.

Figure 27B:
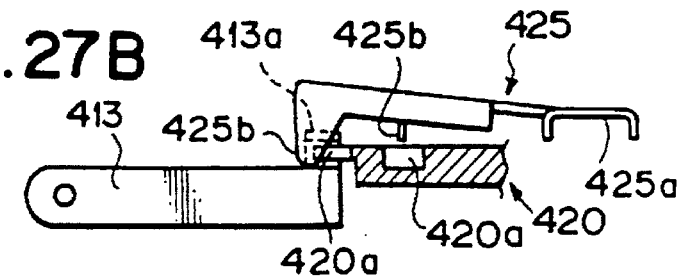

When the chamber lid 413 is closed, an edge portion of the chamber lid 413 abuts against the interlocking portion 425c and displaces the interlocking portion 425c inward, whereby the lock portion 425b is displaced away from the engagement recess 420c of the key member 420 to release the key member 420 as shown in FIG. 27B. Thus the key member 420 is permitted to be moved to the lock position.

When the key member 420 is subsequently moved to the release position and the chamber lid 413 is opened, the interlocking portion 425c is released and the lock portion 425b is again brought into engagement with the engagement recess 420c of the key member 420 to hold it in the release position.

What is claimed is:

1. A photographic camera in which is loaded a film cartridge having a roll film entirely rolled to its leading end around a spool in a cartridge body and a light-shielding shutter member for opening and closing a film exit slit formed in the cartridge body, characterized by having a shutter release inhibiting means which inhibits release of the shutter of the camera during rewinding the film and after completion of rewinding the film so long as the light-shielding shutter member of the film cartridge is open.

2. A photographic camera comprising a cartridge chamber in which is loaded a film cartridge having a roll film entirely rolled to its leading end around a spool in a cartridge body and a light-shielding shutter member for opening and shutting a film exit slit formed in the cartridge body, an entrance opening to the cartridge chamber, and a chamber lid which is mounted on the camera to be moved between an opening position where it opens the entrance opening and a closed position where it closes the entrance opening, wherein the improvement comprises a shutter lock member which moves to a shutter locking position, where it prevents release of the shutter of the camera, in response to operation of a rewind button which is operated when the film is to be rewound into the film cartridge, a holding means which holds the shutter lock member in the shutter locking position, and a release means which causes the holding means to release the shutter lock member after closure of the light-shielding shutter member of the film cartridge in response to opening of the chamber lid.

3. A photographic camera as defined in claim 2 in which said release means is formed by an ejector which urges the film cartridge inserted into the cartridge chamber toward the entrance of the cartridge chamber and the holding means is formed by a projection formed on the ejector to be brought into engagement with the shutter lock member.

4. A photographic camera as defined in claim 2 in which said shutter lock member is interlocked with a barrier which opens and closes the taking lens of the camera so that the shutter lock member is moved to the shutter locking position in response to movement of the barrier to its closed position and is retracted from the shutter locking position in response to movement of the barrier to its opening position.

5. A photographic camera comprising a cartridge chamber in which is loaded a film cartridge having a roll film entirely rolled to its leading end around a spool in a cartridge body and a light-shielding shutter member for opening and shutting a film exit slit formed in the cartridge body, an entrance opening to the cartridge chamber, a chamber lid which is mounted on the camera to be moved between an opening position where it opens the entrance opening and a closed position where it closes the entrance opening, and a key member which locks the chamber lid in the closed position, wherein the improvement comprises a shutter lock member which moves to a shutter locking position, where it prevents release of the shutter of the camera, in response to operation of a rewind button which is operated when the film is to be rewound into the film cartridge, a holding means which holds the shutter lock member in the shutter locking position, and a release means which causes the holding means to release the shutter lock member after closure of the light-shielding shutter member of the film cartridge in response to lock release movement of said key member.

6. A photographic camera as defined in claim 5 in which said shutter lock member is interlocked with a barrier which opens and closes the taking lens of the camera so that the shutter lock member is moved to the shutter locking position in response to movement of the barrier to its closed position and is retracted from the shutter locking position in response to movement of the barrier to its opening position.

* * * * *